(12) United States Patent
Platt

(10) Patent No.: US 6,327,581 B1
(45) Date of Patent: Dec. 4, 2001

(54) METHODS AND APPARATUS FOR BUILDING A SUPPORT VECTOR MACHINE CLASSIFIER

(75) Inventor: John Carlton Platt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/055,477

(22) Filed: Apr. 6, 1998

(51) Int. Cl.$^7$ .................................................. G06F 15/18
(52) U.S. Cl. ............................... 706/12; 706/14; 706/20; 706/62
(58) Field of Search ................................ 706/12, 14, 20, 706/62

(56) References Cited

U.S. PATENT DOCUMENTS

| | | | |
|---|---|---|---|
| 5,640,492 | * 6/1997 | Cortes et al. ........................... | 706/20 |
| 5,649,068 | * 7/1997 | Boser et al. ............................ | 706/12 |
| 6,021,402 | * 2/2000 | Takriti .................................... | 705/412 |
| 6,129,360 | * 2/2001 | Dumais et al. .......................... | 707/6 |

OTHER PUBLICATIONS

Osuna et al., "An Improved Training Algorithm for Support Vector Machines," Proceedings of the 1997 Workshop on Neural Networks for Signal Processing [1997] VII. pp. 276–285, Sep. 1997.*

Osuna et al., "Training Support Vector Machines: An Application to Face Detection," Proceedings of the 1997 IEEE Computer Society Conference on Computer Vision and Pattern Recognition, pp. 130–136, Sep. 1997.*

L. Kaufman, "Solving the Quadratic Programming Problem Arising in Support Vector Classification", *NIPS* 97 SV Workshop on Support Vectors—Abstracts*, (p. 2 of 6) Internet location: http://svm.first.gmd.de/nips97/abstracts.html (downloaded Feb. 20, 1998).

Y. LeCun et al, "Learning Algorithms for Classification: A Comparison on Handwritten Digit Recogition".

A. Smola et al, *NIPS* 97 Workshop on Support Vector Machines*, (2 pages) Internet location: http:// svm.first.gmd.de/nips97/workshop.html (Dec. 22, 1997).

A. Smola et al, *Publications on Support Vector Machines and Related Topics*, (5 pages) Internet location: http://svm.first.gmd.de/publications.html (Dec. 9, 1997).

*Support Vector Machines*, Internet location: http://www.ai.mit.edu/projects/cbcl/web–pis/girosi/home–page/svm.html (downloaded Feb. 20, 1998).

T. Joachims, SVM$^{light}$: *Support Vector Machine*, (5 pages) Internet location: http://www–ai.cs.uni–dortmund.de/thorsten/svm light.html, Version: 1.00 (Christmas Edition, Dec. 22, 1997).

*Lucent Technologies Bell Laboratories Automated Statistical Service Page*, (2 pages) Internet location: http://svm.research.bell–labs.com/ (downloaded Feb. 20, 1998).

(List continued on next page.)

*Primary Examiner*—Mark R. Powell
*Assistant Examiner*—Jeffrey Allen Rossi
(74) *Attorney, Agent, or Firm*—Straub & Pokotylo; John C. Pokotylo

(57) ABSTRACT

Solving a quadratic programming problem involved in training support vector machines by sweeping through a set of training examples, solving small sub-problems of the quadratic programming problem. Each of these sub-problems has an analytic solution, which is faster that the numerical quadratic programming solutions used in the prior art. In one embodiment, training examples with non-optimal Lagrange multipliers are adjusted, one at a time, until all are optimal (e.g. until all examples fulfill the Kuhn-Tucker conditions). In another embodiment, training examples with non-optimal Lagrange multipliers are paired and then adjusted, until all are optimal.

50 Claims, 12 Drawing Sheets

OTHER PUBLICATIONS

C. Burges, "A Tutorial on Support Vector Machines for Pattern Recognition", Submitted to *Data Mining and Knowledge Discovery*, Dec. 23, 1997, pp. 1–43.

T. Joachims, "Text Categorization with Support Vector Machines: Learning with Many Relevant Features", LS–8 Report 23 (Nov. 27, 1997), pp. 1–14 plus title pages.

E. Osuna et al, "An Improved Training Algorithm for Support Vector Machines", *Proc. of IEEE NNSP '97*, Amelia Island, FL (Sep. 23–26, 1997).

R. Fletcher, *Practical Methods of Optimization*, Second Edition, Chapters 1, 7, 9, and 10 (1995).

Joseph–Louis Lagrange web site, downloaded from http://www–groups.dcs.st–and.ac.uk/+e,otl +ee history/Mathematicians/Lagrange.html, downloaded on Oct. 5, 2000.*

Gilbert Strang, Linear Algebra and Its Application, 412–21, 1988.*

John Gribbin, Q is for Quantum, 202–203, 1998.*

* cited by examiner

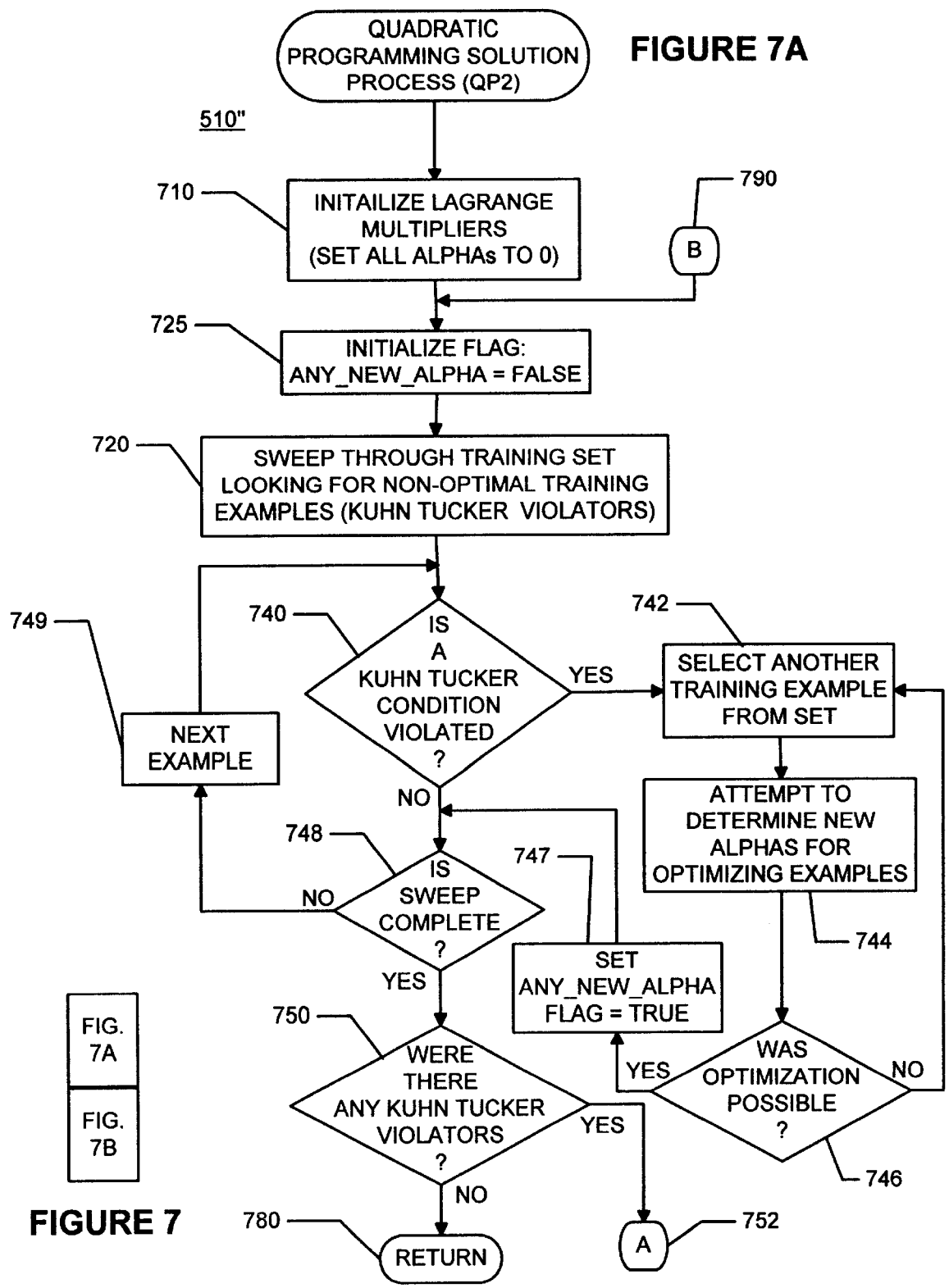

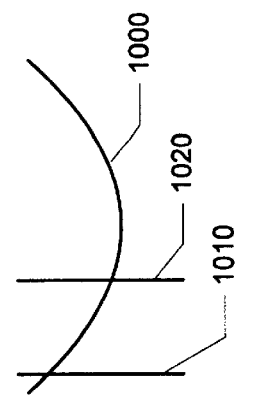
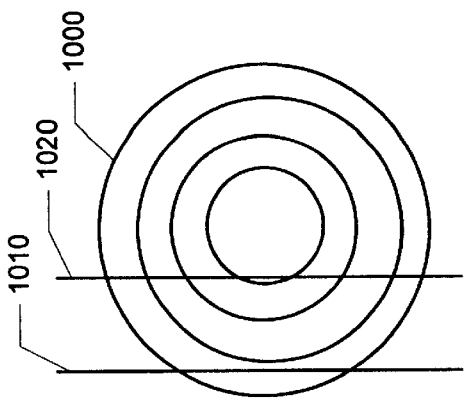
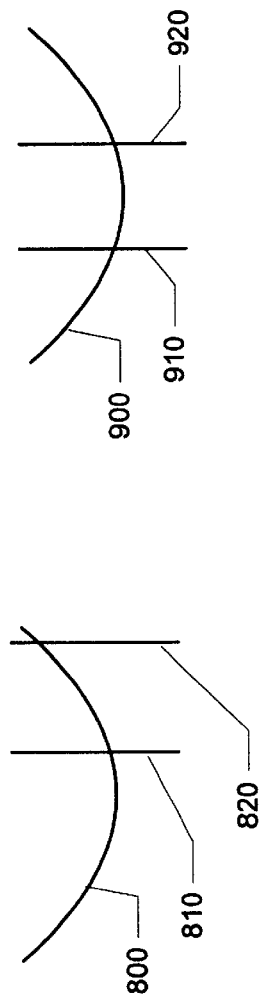
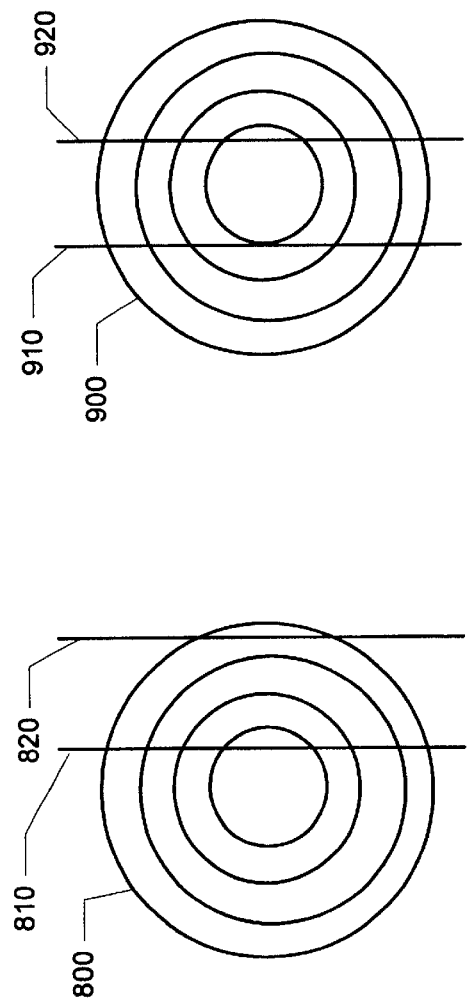

ALPHA = 0

0 < ALPHA < C

ALPHA = C

METHODS AND APPARATUS FOR BUILDING A SUPPORT VECTOR MACHINE CLASSIFIER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

§1. BACKGROUND OF THE INVENTION

§1.1 Field of the Invention

The present invention concerns classifying objects, and more specifically, classifying objects using support vector machines. In particular, the present invention concerns methods and apparatus for building (or training) such support vector machines.

§1.2 Related Art

§1.2.1 THE NEED FOR CLASSIFICATION/RECOGNITION

To increase their utility and intelligence, machines, such as computers for example, are requested to classify (or recognize) objects to an ever increasing extent. For example, computers may use optical character recognition to classify handwritten or scanned numbers and letters. Computers may use pattern recognition to classify an image, such as a face, a fingerprint, a fighter plane, etc. Computers may also use text classification techniques to organize documents or textual information into a hierarchy of predetermined classes for example.

§1.2.2 KNOWN CLASSIFICATION/RECOGNITION METHODS

In this section, some known classification and/or recognition methods are introduced. Further, acknowledged or suspected limitations of these classification and/or recognition methods are introduced. First, rule-based classification and/or recognition is discussed in §1.2.2.1 below. Then, classification and/or recognition systems which use both learning elements and performance elements in are discussed in §1.2.2.2.

§1.2.2.1 RULE BASED CLASSIFICATION AND RECOGNITION

In some instances, objects must be classified with absolute certainty, based on certain accepted logic. A rule-based system may be used to effect such types of classification. Basically, rule-based systems use production rules of the form:

IF condition, THEN fact.

For example, a plant may be classified as an oak tree if certain conditions or rules are met. However, in many instances, rule-based systems become unwieldy, particularly in instances where the number of measured or input values for features or characteristics) becomes large, logic for combining conditions or rules becomes complex, and/or the number of possible classes becomes large. Since humans create the rules and logic, as the complexity of rule-based classifiers increases, the likelihood of a human error being introduced increases dramatically. Thus, over the last decade or so, other types of classifiers have been used increasingly. Although these classifiers do not use static, predefined logic, as do rule-based classifiers, they have outperformed rule-based classifiers in many applications. Such classifiers are discussed in §1.2.2.2 below and typically include a learning element and a performance element. Such classifiers may include neural networks, Bayesian networks, and support vector machines. Although each of these classifiers in known, each is briefly introduced below for the reader's convenience.

§1.2.2.2 CLASSIFIERS HAVING LEARNING AND PERFORMANCE ELEMENTS

As just mentioned at the end of the previous section, classifiers having learning and performance elements outperform rule-based classifiers in many applications. To reiterate, these classifiers may include neural networks (known, but introduced in §1.2.2.2.1 below for the reader's convenience), Bayesian networks (known, but introduced in §1.2.2.2.2 below for the reader's convenience), and support vector machines (discussed in §1.2.2.2.3 below).

§1.2.2.2.1 NEURAL NETWORKS

A neural network is basically a multilayered, hierarchical arrangement of identical processing elements, also referred to as neurons. Each neuron can have one or more inputs but only one input. Each neuron input is weighted by a coefficient. The output of a neuron is typically a function of the sum of its weighted inputs and a bias value. This function, also referred to as an activation function, is typically a sigmoid function. That is, the activation function may be S-shaped, monotonically increasing and asymptotically approaching fixed values (i.e., +1, 0, −1) as its input(s) respectively approaches positive or negative infinity. The sigmoid function and the individual neural weight and bias values determine the response or "excitability" of the neuron to input signals.

In the hierarchical arrangement of neurons, the output of a neuron in one layer may be distributed as an input to one or more neurons in a next layer. A typical neural network may include an input layer and two (2) distinct layers; namely, an input layer, an intermediate neuron layer, and an output neuron layer. Note that the nodes of the input layer are not neurons. Rather, the nodes of the input layer have only one input and basically provide the input, unprocessed, to the inputs of the next layer. If, for example, the neural network were to be used for recognizing a numerical digit character in a 20 by 15 pixel array, the input layer could have 300 neurons (i.e., one for each pixel of the input) and the output array could have 10 neurons (i.e., one for each of the ten digits).

The use of neural networks generally involves two (2) successive steps. First, the neural networks is initialized and trained on known inputs having known output values (or classifications). Once the neural network is trained, it can then be used to classify unknown inputs. The neural network may be initialized by setting the weights and biases of the neurons to random values, typically generated from a Gaussian distribution. The neural network is then trained using a succession of inputs having known outputs (or classes). As the training inputs are fed to the neural network, the values of the neural weights and biases are adjusted (e.g., in accordance with the known back-propagation technique) such that the output of the neural network of each individual training pattern approaches or matches the known output. Basically, a gradient descent in weight space is used to minimize the output error. In this way, learning using successive training inputs converges towards a locally optimal solution for the weights and biases. That is, the weights and biases are adjusted to minimize an error.

In practice, the system is not trained to the point where it converges to an optimal solution. Otherwise, the system would be "over trained" such that it would be too specialized to the training data and might not be good at classifying inputs which differ, in some way, from those in the training set. Thus, at various times during its training, the system is tested on a set of validation data. Training is halted when the system's performance on the validation set no longer improves.

Once training is complete, the neural network can be used to classify unknown inputs in accordance with the weights and biases determined during training. If the neural network can classify the unknown input with confidence, one of the outputs of the neurons in the output layer will be much higher than the others.

To ensure that the weight and bias terms do not diverge, the algorithm uses small steps. Consequently, convergence is slow. Also, the number of neurons in the hidden layer cannot easily be determined a priori. Consequently, multiple time-consuming experiments are often run to determine the optimal number of hidden neurons.

§1.2.2.2.2 BAYESIAN NETWORKS

Having introducing neural networks above, Bayesian networks are now briefly introduced. Basically, Bayesian networks use hypotheses as intermediaries between data (e.g., input feature vectors) and predictions (e.g., classifications). The probability of each hypothesis, given the data ("P(hypo|data)"), may be estimated. A prediction is made from the hypotheses using posterior probabilities of the hypotheses to weight the individual predictions of each of the hypotheses. The probability of a prediction X given data D may be expressed as:

$$P(X \mid D) = \sum_i (X \mid D, H_i) P(H_i \mid D)$$
$$= \sum_i P(X \mid H_i) P(H_i \mid D)$$

where $H_i$, is the $i^{th}$ hypothesis. A most probable hypothesis $H_i$ that maximizes the probability of $H_i$ given D ($P(H_i|D)$) is referred to as a maximum a posterior hypothesis (or "$H_{MAP}$") and may be expressed as follows:

$$P(X|D) \approx P(X|H_{MAP})$$

Using Bayes' rule, the probability of a hypothesis $H_i$ given data D may be expressed as:

$$P(H_i \mid D) = \frac{P(D \mid H_i) P(H_i)}{P(D)}$$

The probability of the data D remains fixed. Therefore, to find $H_{MAP}$, the numerator must be maximized.

The first term of the numerator represents the probability that the data would have been observed given the hypothesis i. The second term represents the prior probability assigned to the given hypothesis i.

A Bayesian network includes variables and directed edges between the variables, thereby defining a directed acylic graph (or "DAG"). Each variable can assume any of a finite number of mutually exclusive states. For each variable A, having parent variables $B_1, \ldots B_n$, there is an attached probability table ($P(A|B_1, \ldots B_n)$).

Assuming that the structure of the Bayesian network is known and the variables are observable, only the set of conditional probability tables need be learned. These tables can be estimated directly using statistics from a set of learning examples. If the structure is known but the variables are hidden, learning is analogous to neural network learning discussed above.

An example of a simple Bayesian network is introduced below. A variable "MML" may represent a "moisture of my lawn" and may have states "wet" and "dry". The MML variable may have "rain" and "my sprinkler on" parent variables each having "Yes" and "No" states. Another variable, "MNL" may represent a "moisture of my neighbor's lawn" and may have states "wet" and "dry". The MNL variable may share the "rain" parent variable. In this example, a prediction may be whether my lawn is "wet" or "dry". This prediction may depend of the hypotheses (i) if it rains, my lawn will be wet with probability ($x_1$) and (ii) if my sprinkler was on, my lawn will be wet with probability ($x_2$). The probability that it has rained or that my sprinkler was on may depend on other variables. For example, if my neighbor's lawn is wet and they don't have a sprinkler, it is more likely that it has rained. An example of a Bayesian network associated with the "wet grass" problem is presented in the text: Jensen, *An Introduction to Bayesian Networks*, pp. 22–25, Springer-Verlag, New York (1997).

As discussed above, Bayesian networks may be trained, as was the case with neural networks. Advantageously, by allowing prior knowledge to be provided for, the learning process may be shortened. Unfortunately, however, prior probabilities of the hypotheses are usually unknown, in which case a uniform prior is distributed over all of the hypotheses.

§1.2.2.2.3 SUPPORT VECTOR MACHINES

§1.2.2.2.3.1 WHY USE SVMs?

Support vector machines (or "SVMs") are another type of trainable classifier. SVMs are reportedly more accurate at classification than naive Bayesian networks in certain applications, such as text classification for example. (See, e.g., the article, Joachims, "Text Categorization with Support Vector Machines: Learning with Many Relevant Features", *LS-8, Report* 23, University of Dortmund Computer Science Department (November 1997).) They are also reportedly more accurate than neural networks in certain applications, such as reading handwritten characters for example. (See, e.g., the article, LeCun et al., "Learning Algorithms for Classification: A Comparison on Handwritten Digit Recognition," *Neural Networks: The Statistical Mechanics Perspective,* Oh et al. (Eds.) pp. 261–276, World Scientific (1995). Unfortunately, however, SVMs reportedly take longer to train than naive Bayesian classifiers. Thus, there is a need for methods and/or apparatus to build (or train) SVMs in an efficient manner.

Although SVMs are known to those skilled in the art, their theory and operation will be introduced for the reader's convenience. First, the general idea behind SVMs will be discussed in §1.2.2.2.3.2 below. Then, the derivation of primal and dual quadratic problems for training SVMs, as well as the challenges associated with solving such quadratic problems will be discussed in §1.2.2.2.3.3 below. Thereafter special cases with non-separable data will be discussed in §1.2.2.2.3.4 below. Finally, special cases of non-linear SVMs will be discussed in §1.2.2.2.3.5 below.

§1.2.2.2.3.2 SVM THEORY

An object to be classified may be represented by a number of features. If, for example, the object to be classified is represented by two (2) features, it may be represented by a point of two (2) dimensional space. Similarly, if the object to be classified is represented by n features, also referred to as a "feature vector", it may be represented by a point in n-dimensional space. The simplest form of an SVM defines a plane in the n-dimensional space (also referred to as a hyperplane) which separates feature vector points associated with objects "in a class" and feature vector points associated with objects "not in the class". For example, referring to FIG. 1A, plane 110 separates feature vector points, denoted with blackened circles, associated with objects "in a class" from feature vector points, denoted with hollow circles, associated with objects "not in a class". A number of classes can be defined by defining a number of hyperplanes. The hyperplane defined by a trained SVM maximizes a distance (also referred to as an Euclidean distance) from it to the closest points (also referred to as "support vectors") "in the class" and "not in the class". Referring again to FIG. 1A, support vectors 120, as well as support vectors 130, are located at a distance "d" from the plane 110. A hyperplane 110 is sought which maximizes these distances "d", so that the SVM defined by the hyperplane is robust to input noise.

§1.2.2.3.3 TRAINING SVMs AND ASSOCIATED QUADRATIC PROGRAMMING PROBLEMS

In the following, vectors are denoted by bold, lower case, typeface or by arrow "hats", and matrices are denoted by bold uppercase typeface. Assuming the "in class" and "not in class" points can be separated by a hyperplane defining a maximum margin, the SVM may be trained. A pair of adjustable parameters, w (a "weight vector") and b (a "threshold") can be defined such that all of the training data X (where X is a matrix composed of the features vectors $x_i$ of the training set), having a known classification y, satisfy the following constraints:

$$\vec{x}_i \cdot \vec{w} + b \geq +1 \text{ for } y_i = +1 \quad (1)$$

$$\vec{x}_i \cdot \vec{w} + b < -1 \text{ for } y_i = -1 \quad (2)$$

where:

i=1, . . . , number of training examples;

$x_i$ is the $i^{th}$ input vector;

w is a weight vector parameter;

b is a threshold parameter; and $y_i$ is a known classification associated with the $i^{th}$ training example and is +1 if the example is "in the class" and -1 if the training example is "not in the class".

The inequality conditions of equations (1) and (2) can be combined into the following inequality condition by multiplying each side of the equations by y and +1 or -1, and subtracting 1 from both sides:

$$y_i(\vec{x}_i \cdot \vec{w} + b) - 1 \geq 0 \quad (3)$$

The points for which the inequality of equation (1) hold lie on the hyperplane $x_i$ dot w+b=1, with normal w, and perpendicular distance to the origin (1−b)/‖w‖, where ‖w‖ is the Euclidean norm of the vector w. Similarly, the points for which the inequality of equation (2) hold lie on the hyperplane $x_i$ dot w+b=−1, with perpendicular distance to the origin (−1−b)/‖w‖. Hence, the margin in the sum of both of the distances, namely 2/‖w‖. By minimizing ‖w‖², subject to the constraints of equation (3), the hyperplane providing the maximum margin can therefore be determined.

Thus, training an SVM presents a constrained optimization (e.g., minimization) problem. That is, a function is minimized (referred to as "the objective function") subject to one or more constraints. Although those skilled in the art are familiar with methods for solving constrained optimization problems (see, e.g., the text, Fletcher, *Practical Methods of Optimization*, $2^{nd}$ ed., pp. 195–224, John Wiley & Sons (1987)), relevant methods will be introduced below for the reader's convenience.

A point that satisfies all constraints is referred to as a "feasible point" and is located in a "feasible region". A constrained optimization (e.g., minimization) problem is solved by a feasible point having no feasible descent directions. Thus, methods for solving constrained minimization problems are often iterative so that a sequence of values converges to a local minimum. For example, FIG. 2A is a plan view of which depicts the topography of a hull-shaped objective function 210 and a linear constraint 220. It is assumed that the feasible region lies to the right of the linear constraint 220. FIG. 2B is a side view of the objective function 210 and constraint 220 taken along a section defined by line BB. As can be seen in these Figures, a point P of the object function 210 is not optimized (minimized) since it has a feasible descent direction. Point P' of the object function 210 is converging towards an optimum (minimum) solution but is still not optimized (minimized) since it also has a feasible descent. Although point P'' of the object function 210 can descend, such descent would take it out of the feasible region (e.g., to the left of linear constraint 220.) Thus, since point P'' is a feasible point having no feasible descent, it offers a solution to the constrained optimization problem. Note that point P''' of the object function 210 is not an optimum point since it has a feasible descent path (i.e., towards point P'').

Those skilled in the art recognize that Lagrange multipliers provide a way to transform equality-constrained optimization problems into unconstrained extremization problems. Lagrange multipliers (α) may be used to find an extreme value of a function f(x) subject to a constraint g(x), such that 0=Λf(x)+αΛg(x), where Λ is a gradient function. Thus, if f(w)=‖w‖² and g(w)=$y_i$ ($x_i$ dot w+b)−1, then the Lagrangian:

$$L_p = \frac{1}{2}\|\vec{w}\|^2 - \sum_{i=1}^{nte} \alpha_i y_i (\vec{x}_i \cdot \vec{w} + b) + \sum_{i=1}^{nte} \alpha \quad (4)$$

where "nte" is the number of training examples, results.

As is known from mathematical programming literature, the concept of "duality" allows the provision of an alternative formulation of a mathematical programming problem which is, for example, computationally convenient. Minimizing equation (4) subject to the constraint that "alpha" must be non-negative is referred to as a "primal" (or original) problem. The "dual" (i.e., the transformed) problem maximizes equation (4) subject to the constraints that the gradient of $L_p$ with respect to w and b vanishes and that the "alpha" must be non-negative. This transformation is known as the "Wolfe dual". The dual constraints can be expressed as:

$$\vec{w} = \sum_i \alpha_i y_i \vec{x}_i \quad (5)$$

$$\sum_i \alpha_i y_i = 0 \quad (6)$$

Substituting the conditions of equations (5) and (6) into equation (4) yields the following Lagrangian:

$$L_D = \sum_{i=1 \text{ to nte}} \alpha_i - \frac{1}{2} \sum_{i,j=1 \text{ to nte}} \alpha_i \alpha_j y_i y_j \vec{x} \cdot \vec{x} \quad (7)$$

The solution to the dual quadratic programming problem can be determined by maximizing the Lagrangian dual problem $L_D$.

The support vector machine can therefore be trained by solving the dual Lagrangian quadratic programming problem. There is a Lagrange multiplier $\alpha_i$ for each example i of a training set. The points for which $\alpha_i$ is greater than zero are the "support vectors". (Recall points 120 and 130 of FIG. 1A). These support vectors are the critical elements of the training set since they lie closest to the decision boundary (Recall plane 110 of FIG. 1A) and therefore define the margin from the decision boundary.

Unfortunately, the quadratic programming problem of equation (7) merely represents the optimization problem with constraints in a more manageable form than the problems of equations (1) and (2). In the past, numerical methods, such as constrained conjugate gradient ascent, projection methods, Bunch-Kaufman decomposition, and interior points methods, were used to solve the quadratic problem. Suffice to say that these numerical methods are not trivial, particularly when there are a large number of examples i in the training set. Referring to equation (7), solving the quadratic problem involves an "nte" by "nte" matrix (where "nte" is the number of examples in the training set). For applications in which relatively large numbers of training examples are needed (e.g., on the order of 10,000 or 100,000), this matrix becomes so large that it cannot even be stored on many computers. Moreover, solving the quadratic problem with a numerical method is computationally expensive. Thus, methods and apparatus for training a support vector machine, in a manner that is less computationally expensive and that does not require storing large matrices is needed.

Recognizing the above problem related to training SVMs, Vladimir Vapnik, who is credited with developing SVMs, introduced an iterative training method referred to as "chunking". Though the "chunking" method of training SVMs is understood by those skilled in the art, it will be introduced here for the reader's convenience. At each step, a subproblem consisting of a union of non-zero Lagrange multipliers from a previous step and a number of worst training examples that violate Kuhn-Tucker conditions (Kuhn-Tucker conditions are discussed below) is solved. These steps are repeated until all examples fulfill the Kuhn-Tucker conditions. In this way, instead of operating on a matrix the size of the square of the number of training examples, the matrix at each step is now on the order of the number of non-zero Lagrange multipliers, squared. Since the matrices are smaller, the algorithm can be faster. Although chunking makes training SVMs tractable, it is still too slow for some applications. For example, the number of non-zero Lagrange multipliers can still grow into the thousands in certain applications. Moreover, the optimization problem is still solved with a numerical quadratic programming technique. Each iteration is time consuming. Thus, methods and apparatus for training SVMs, which offer a performance improvement over the chunking method, are needed.

A reportedly better training algorithm for SVMs was introduced in the paper, E. Osuna et al., "An Improved Training Algorithm for Support Vector Machines," *Proceedings of IEEE NNSP '97* (September 1997) (hereafter referred to as "the Osuna method"). The Osuna method stores a fixed size matrix, rather than a matrix that grows with the number of non-zero Lagrange multipliers. A fixed number of Lagrange multipliers are optimized at every step. With each new step, one of the old Lagrange multipliers is removed from consideration and a new example whose output violates the Kuhn-Tucker conditions is added. The Osuna paper provides a proof that the objective function will decrease with every step such that the Osuna method converges to a solution. However, the Osuna method still disadvantageously requires a numerical solution at each step. Although it converges to a solution, the Osuna method uses an entire numerical quadratic programming problem just to "fix" one Lagrange multiplier that violates the Kuhn-Tucker conditions. It is believed that the Osuna method is still too slow for certain applications in which a large number of training examples are used during training. Thus, improved methods and apparatus for training SVMs are needed.

§1.2.2.2.3.4 NEW-SEPARABILITY

There are instances in which a hyperplane (or hypersurface) can separate most, but not all, "in class" points and "not in class" points. Such data is referred to as "non-separable" data. In these instances, the constraints of equations (1) and (2) may be relaxed, but only when (and to the extent expected to be) necessary. This can be done by introducing so-called "slack variables" $\xi_i$ such that equations (1) and (2) are expressed as:

$$\vec{x}_i \cdot \vec{w} + b \geq +1 - \xi_i \text{ for } y_i = +1 \quad (8)$$

$$\vec{x}_i \cdot \vec{w} + b < -1 + \xi_i \text{ for } y_i = -1 \quad (9)$$

where $\xi_i$ is greater than or equal to zero of all i.

A cost parameter "C" may be selected by a user such that a larger C corresponds to assigning a higher penalty to errors. The objective function in the primal function (4) thus becomes:

$$\|w\|^2 + C \sum_i \xi_i$$

Accordingly, the additional constraint:

$$0 \leq \alpha_i \leq C \quad (10)$$

is added to the dual problem set forth in equation (7) above. Any methods or apparatus for training SVMs should be able to accommodate slack variables and associated cost parameters.

It is known by those skilled in the art that an objective function, subject to inequality or equality constraints, has an optimum point if certain necessary and sufficient conditions are met for that point. The conditions are known to those skilled in the art as Kuhn-Tucker (or "KT") conditions. In the context of SVMs, the Kuhn-Tucker conditions may be expressed as follows.

if $\alpha_n = 0$ then $O_n y_n > 1$ (11)

if $0 < \alpha_n < C$ then $O_n y_n = 1$ (12)

if $\alpha_n = C$ then $O_n y_n < 1$ (13)

where $O_n = w$ dot $x_n - b$, and where $O_n$ is the actual output of the SVM for example n.

The condition of expression (11) corresponds to a training vector point beyond the margin to the hyperplane (or hypersurface) defined by a trained SVM. The condition of expression (12) corresponds to a training vector point on the margin (i.e., a "support vector") to the hyperplane (or hypersurface) defined by the trained SVM. The condition of expression (13) corresponds to a training vector point which "costs" too much, in terms of a slack variable, to make separable.

§1.2.2.2.3.5 Non-Linear SVMs

There are instances in which a decision function is not a linear function of the data. For example, referring to FIG. 3, the high dimensional curve 310 separates feature vector points, denoted with blackened circles, associated with objects "in a class" from feature vector points, denoted with hollow circles, associated with objects "not in the class". Points 320 and 330 are support vectors. Recall from equation (7) above that the training data $x_i$ appears in the form of dot products. In such instances, it has been shown (See, e.g., the paper B. E. Boser, et al, "A training algorithm for optimal margin classifiers," *Fifth Annual Workshop on Computational Learning Theory* (1992)) that a so-called "kernel function":

$$k(\vec{x}_i, \vec{x}_j)$$

can replace the dot product. The kernel function provides a distance. Therefore, for non-linear classifiers, equation (7) is written as:

$$L_D = \sum_i \alpha_i - \frac{1}{2} \sum_{i,j} \alpha_i \alpha_j y_i y_j k(\vec{x}_i, \vec{x}_j) \quad (14)$$

Any methods or apparatus for training SVMs should be able to accommodate kernel functions.

§2. SUMMARY OF THE INVENTION

The present invention basically solves the quadratic programming problem involved in training support vector machines. The present invention sweeps through a set of training examples, solving small sub-problems of the quadratic programming problem. Each of these sub-problems has an analytic solution, which is faster than the numerical quadratic programming solutions used in the prior art.

More specifically, in a first embodiment, the threshold b is assumed to be zero (i.e., no additional linear equality constraint). In a second embodiment, there is a threshold b (i.e., there is an additional linear equality constraint). In the first embodiment, training examples with non-optimal Lagrange multipliers are adjusted, one at a time, until all are optimal (e.g., until all examples fulfill the Kuhn-Tucker conditions). The second embodiment is similar to the first embodiment except that training examples with non-optimal Lagrange multipliers are paired and then adjusted, until all are optimal. Various optimizations, such as an optimization which may be used for text classification are described below.

§3. BRIEF DESCRIPTION OF THE DRAWINGS

Figure 7B:
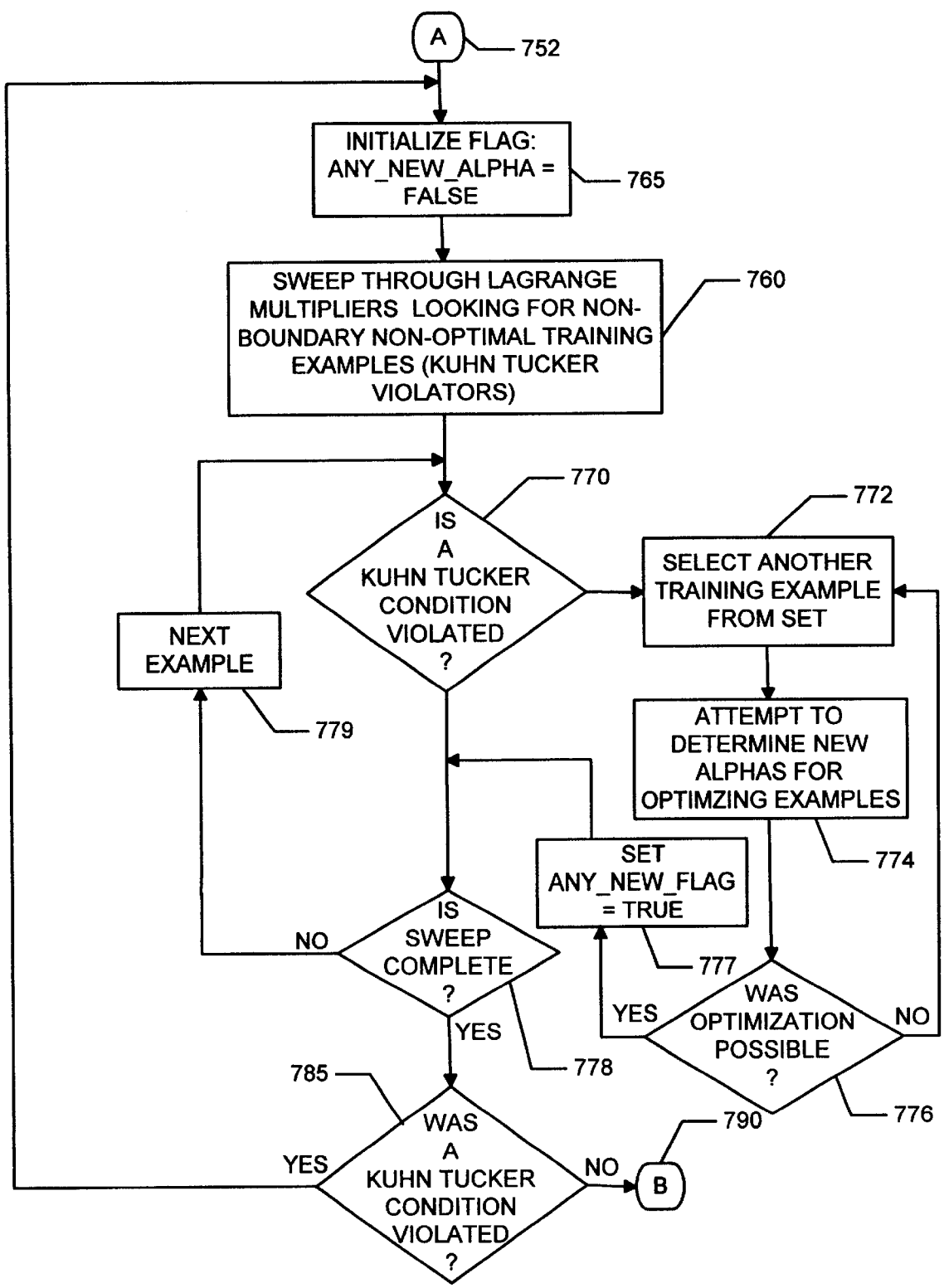

FIG. 7, which includes FIGS. 7A and 7B, is a high level flow diagram of a second exemplary methodology for performing an aspect of the present invention.

FIGS. 8A, 9A, and 10A, and 8B, 9B, and 10B, are cross-sectional side views, and plan views, respectively, of constrained optimization problems having two (2) inequality constraints.

Figure 11:
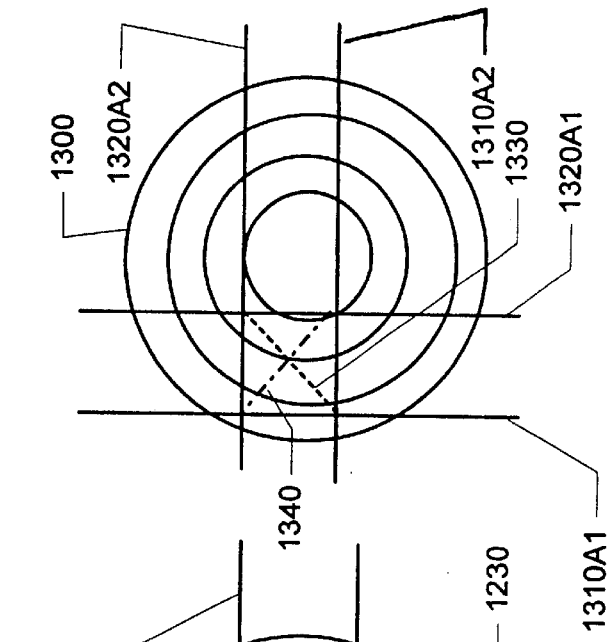
Figure 12:
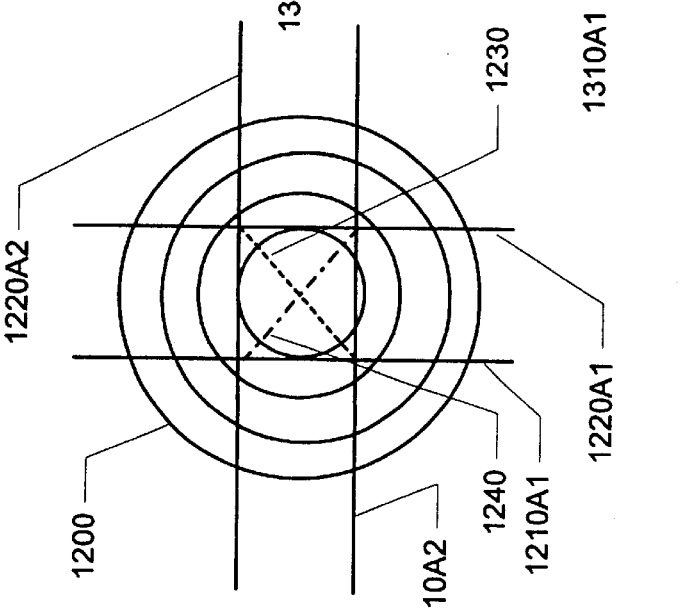
Figure 13:
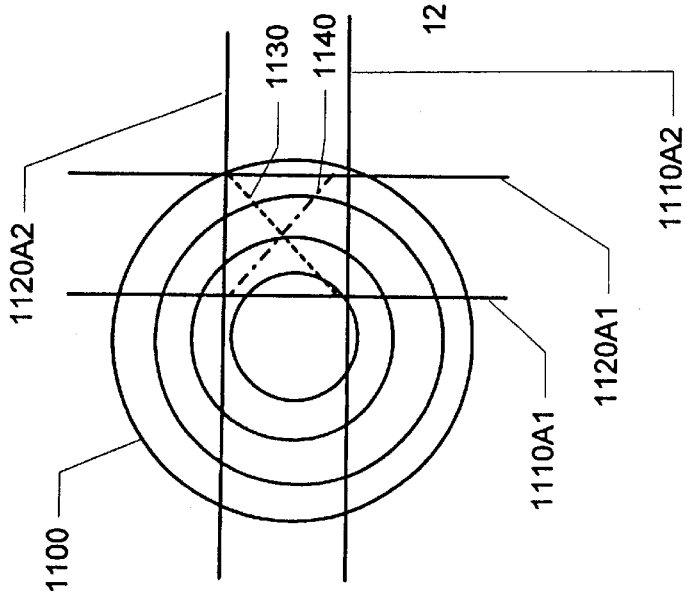

FIGS. 11, 12, and 13 are plan views of constrained optimization problems.

Figure 14:
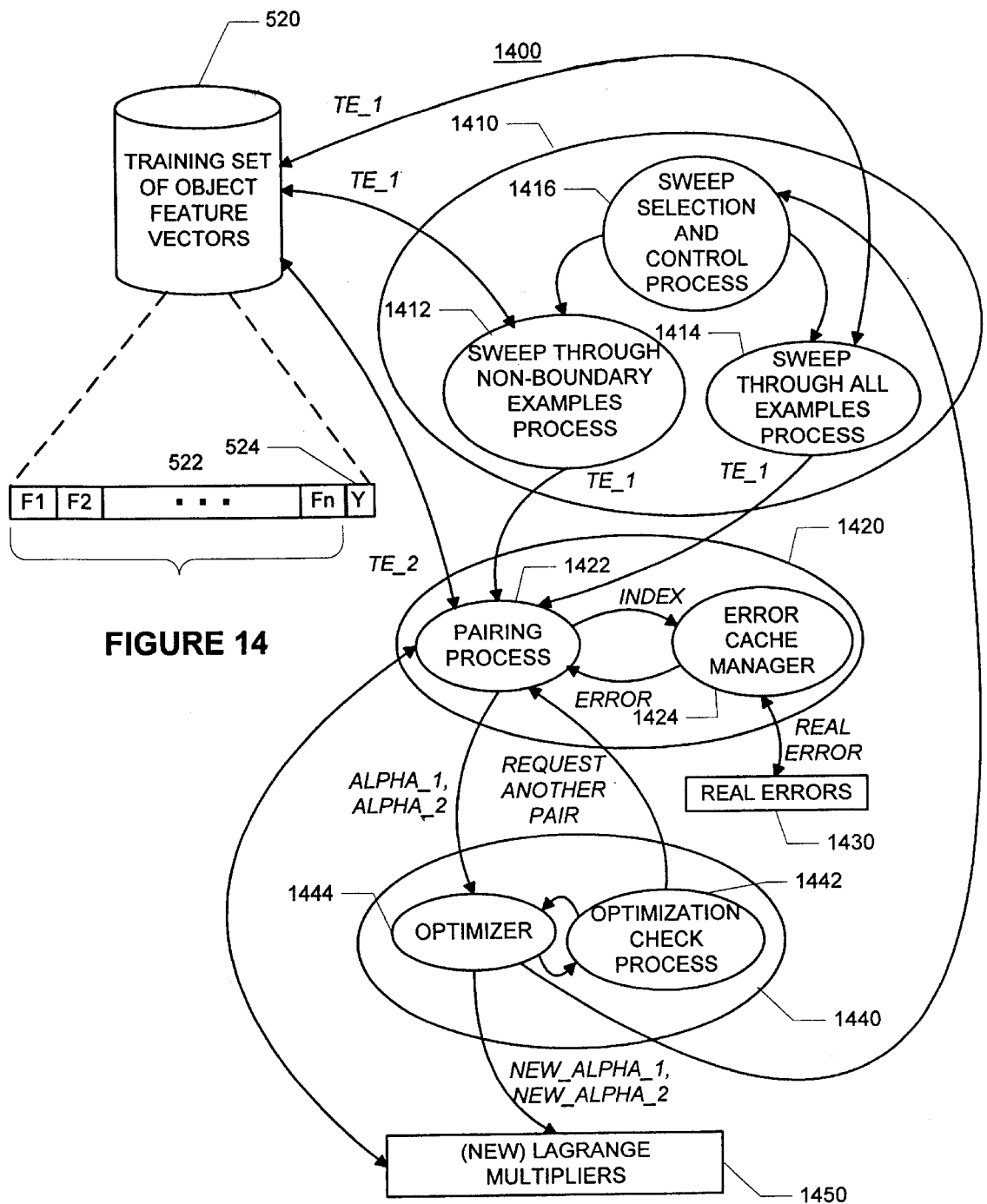

FIG. 14 is a diagram of processes and data which may be used by a second exemplary embodiment of the present invention.

§4. DETAILED DESCRIPTION

The present invention concerns novel methods and apparatus for building support vector machines. The following description is presented to enable one skilled in the art to make and use the invention, and is provided in the context of a particular application and its requirements. Various modifications to the disclosed embodiments will be apparent to those skilled in the art, and the general principles set forth below may be applied to other embodiments and applications. Thus, the present invention is not intended to be limited to the embodiments shown.

The basic functions performed by the present invention will be introduced in § 4.1. Then, exemplary structures and methodologies of apparatus and methods, respectively, for using the present invention will be described in § 4.2.

§ 4.1 Functions of the Present Invention

The present invention basically solves the quadratic programming problem involved in training support vector machines. The present invention sweeps through a set of training examples, solving small sub-problems of the quadratic programming problem. Each of these sub-problems has an analytic solution, which is faster that the numerical quadratic programming solutions used in the prior art.

More specifically, in a first embodiment, the threshold b is assumed to be zero (i.e., no additional linear equality constraint). In a second embodiment, there is a threshold b (i.e., there is an additional linear equality constraint). In the first embodiment, training examples with non-optimal Lagrange multipliers are adjusted, one at a time, until all are optimal (e.g., until all examples fulfill the Kuhn-Tucker conditions). The second embodiment is similar to the first embodiment except that training examples with non-optimal Lagrange multipliers are paired and then adjusted, until all are optimal. Various optimizations, such as an optimization which may be used for text classification are described below.

§ 4.2 Exemplary Structures and Methodologies

Exemplary architectures for performing processes which may be used by a methodology of the present invention are first described, with reference to FIGS. 4A and 4B, in § 4.2.1 below. Then, exemplary methodologies of the present invention are described, with reference to FIGS. 5, 6, 7A, 7B, and 14 and Exhibits A and B in §§ 4.2.2 and 4.2.3 below.

§ 4.2.1 Exemplary Apparatus

Processes which may be used by the present invention are described in § 4.2.1.1 below with reference to FIG. 5. Some or all of these processes may be carried out on a personal computer based system 400, as depicted in FIG. 4A, or a more general machine based system 400' as depicted in FIG. 4B. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at lease some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

Figure 1A:
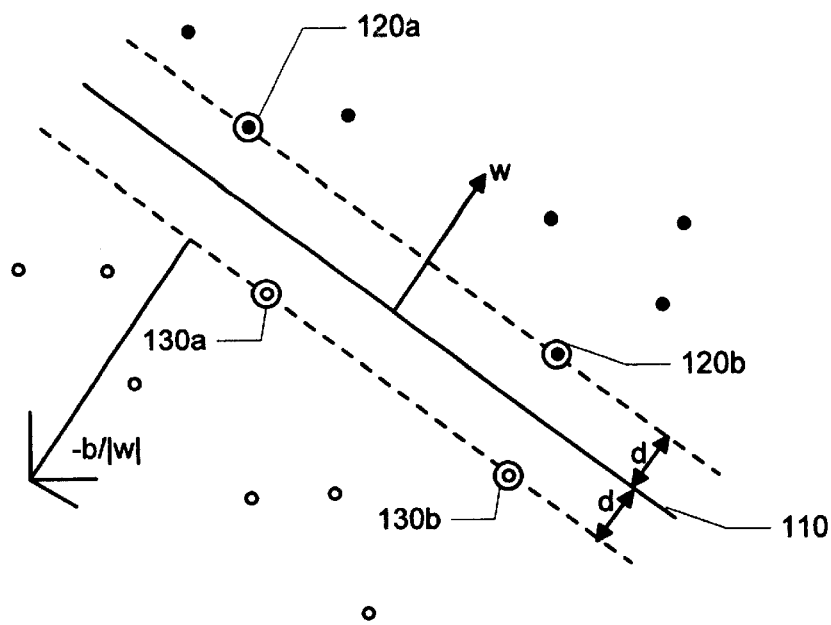
FIG. 1A illustrates a boundary and support vectors in an SVM.
Figure 1B:
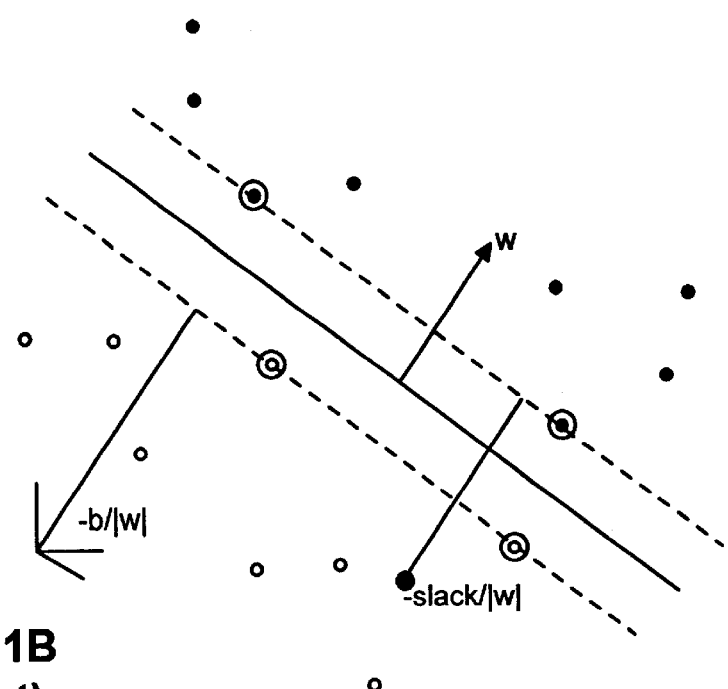
FIG. 1B further illustrates the use of slack variables to account for non-separable training data when training an SVM.
Figure 2A:
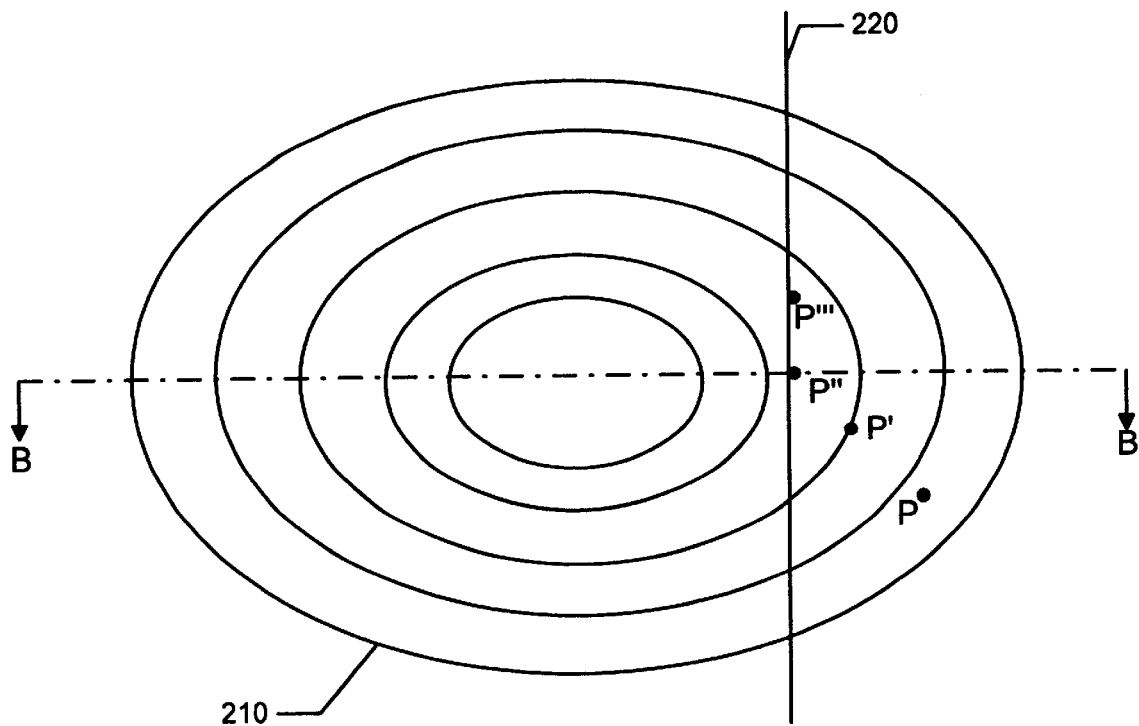
FIG. 2A is a plan view and FIG. 2B is a cross-sectional side view of a constrained optimization problem.
Figure 2B:
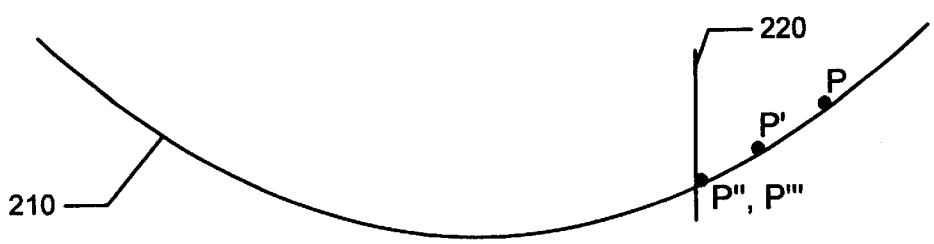
Figure 3:
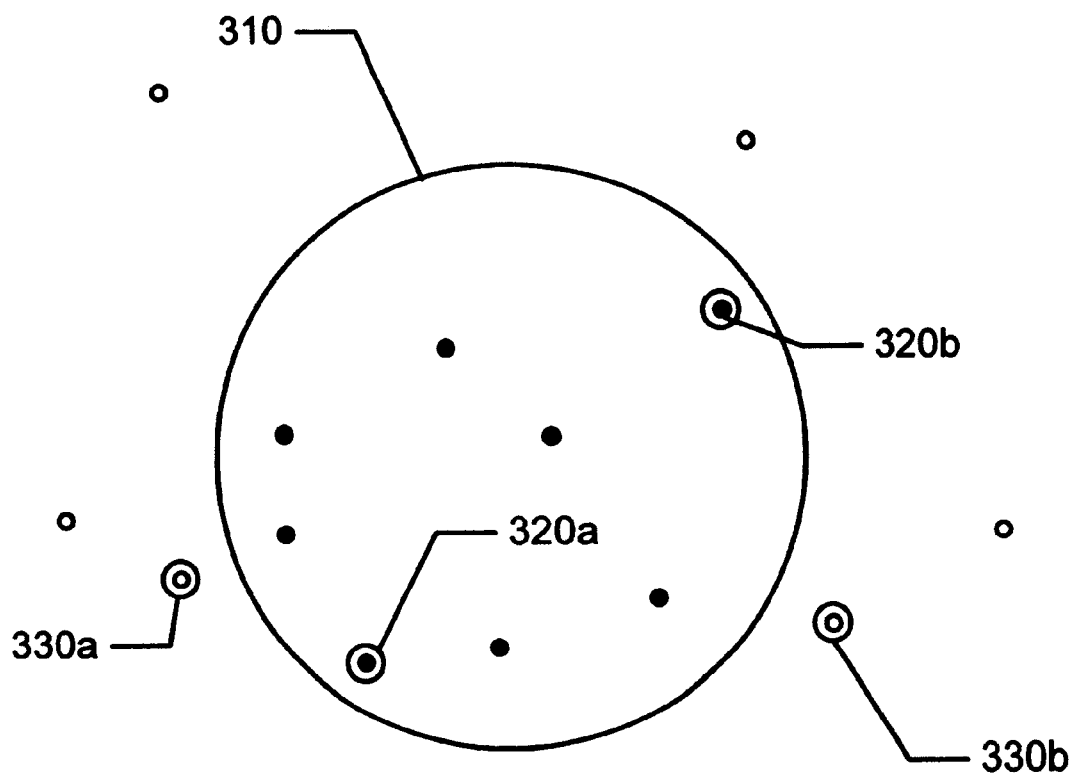
FIG. 3 illustrates an SVM having a non-linear separation boundary.
Figure 4A:
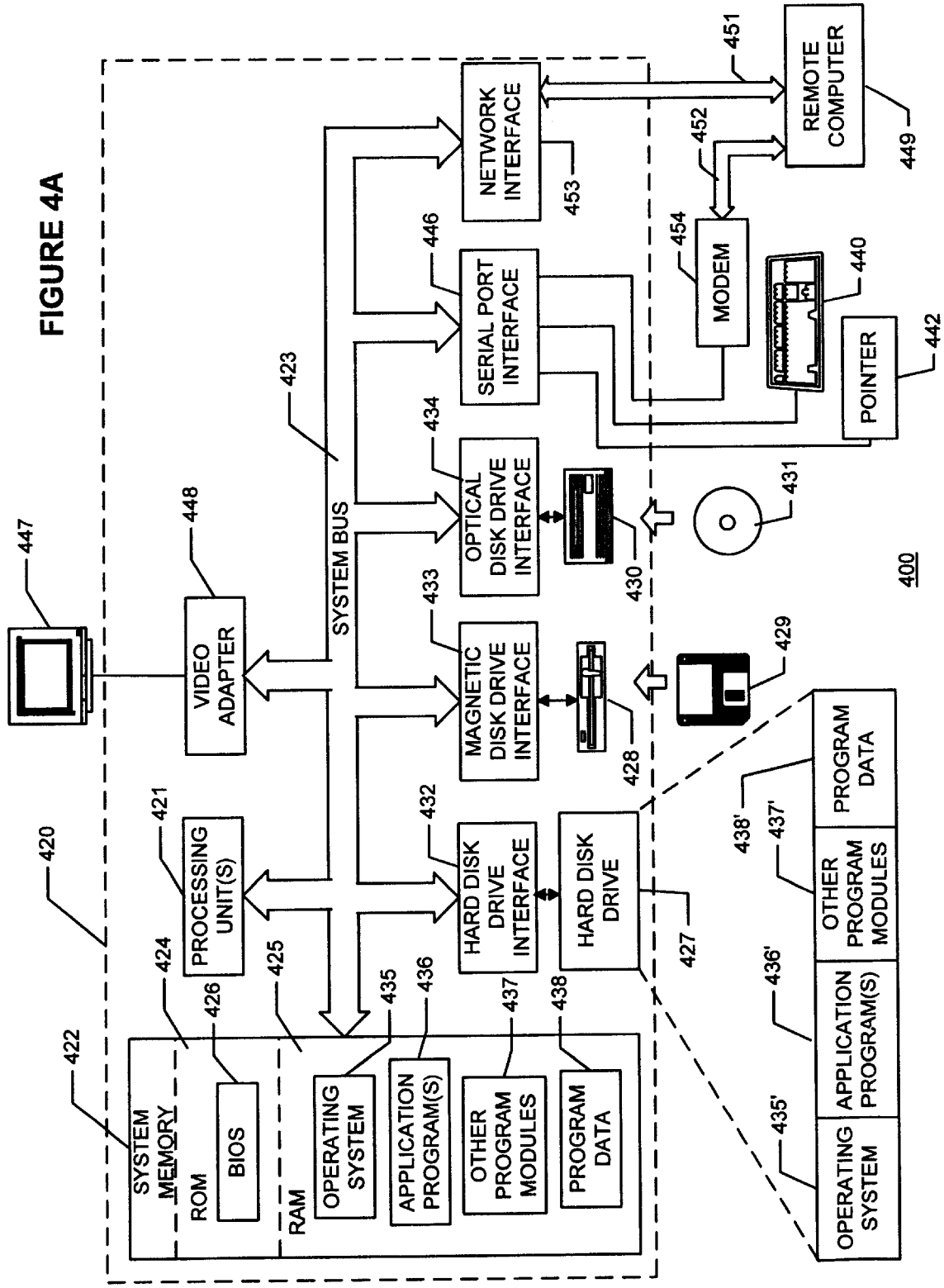
FIGS. 4A and 4B are block diagrams of systems on which the present invention may be implemented.

FIG. 4A depicts a general purpose computing device in the form of a conventional personal computer 420. The personal computer 420 may include a processing unit 421, a system memory 422, and a system bus 423 that couples various system components including the system memory to the processing unit 421. The system bus 423 may be any of several types of bus structures including a memory bus or memory controller, a peripheral bus, and a local bus using any of a variety of bus architectures. The system memory may include read only memory (ROM) 424 and/or random access memory (RAM) 425. A basic input/output system 426 (BIOS), containing basic routines that help to transfer information between elements within the personal computer 420, such as during start-up, may be stored in ROM 424. The personal computer 20 may also include a hard disk drive 427 for reading from and writing to a hard disk, (not shown), a magnetic disk drive 428 for reading from or writing to a (e.g., removable) magnetic disk 429, and an optical disk drive 430 for reading from or writing to a removable (magneto) optical disk 431 such as a compact disk or other (magneto) optical media. The hard disk drive 427, magnetic disk drive 428, and (magneto) optical disk drive 430 may be coupled with the system bus 423 by a hard disk drive interface 432, a magnetic disk drive interface 433, and a (magneto) optical drive interface 434, respectively. The drives and their associated storage media provide nonvolatile storage of machine readable instructions, data structures, program modules and other data for the personal computer 420. Although the exemplary environment described herein employs a hard disk, a removable magnetic disk 429 and a removable (magneto) optical disk 431, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 423, magnetic disk 429, (magneto) optical disk 431, ROM 424 or RAM 425, such as an operating system 435, one or more application programs 436, other program modules 437, and/or program data 438 for example. A user may enter commands and information into the personal computer 420 through input devices, such as a keyboard 440 and pointing device 442 for example. Other input devices (not shown) such as a microphone, joystick, game pad, satellite dish, scanner, or the like may also be included. These and other input devices are often connected to the processing unit 421 through a serial port interface 446 coupled to the system bus. However, input devices may be connected by other interfaces, such as a parallel port, a game port or a universal serial bus (USB). A monitor 447 or other type of display device may also be connected to the system bus 423 via an interface, such as a video adapter 448 for example. In addition to the monitor 447, the personal computer 420 may include other peripheral output devices (not shown), such as speakers and printers for example.

The personal computer 420 may operate in a networked environment which defines logical connections to one or more remote computers, such as a remote computer 449. The remote computer 449 may be another personal computer, a server, a router, a network PC, a peer device or other common network node, and may include many or all of the elements described above relative to the personal computer 420. The logical connections depicted in FIG. 4A include a local area network (LAN) 451 and a wide area network (WAN) 452, an intranet and the Internet.

When used in a LAN, the personal computer 420 may be connected to the LAN 451 through a network interface adapter (or "NIC") 453. When used in a WAN, such as the Internet, the personal computer 420 may include a modem 454 or other means for establishing communications over the wide area network 452. The modem 454, which may be internal or external, may be connected to the system bus 423 via the serial port interface 446. In a networked environment, at least some of the program modules depicted relative to the personal computer 420 may be stored in the remote memory storage device. The network connections shown are exemplary and other means of establishing a communications link between the computers may be used.

Figure 4B:
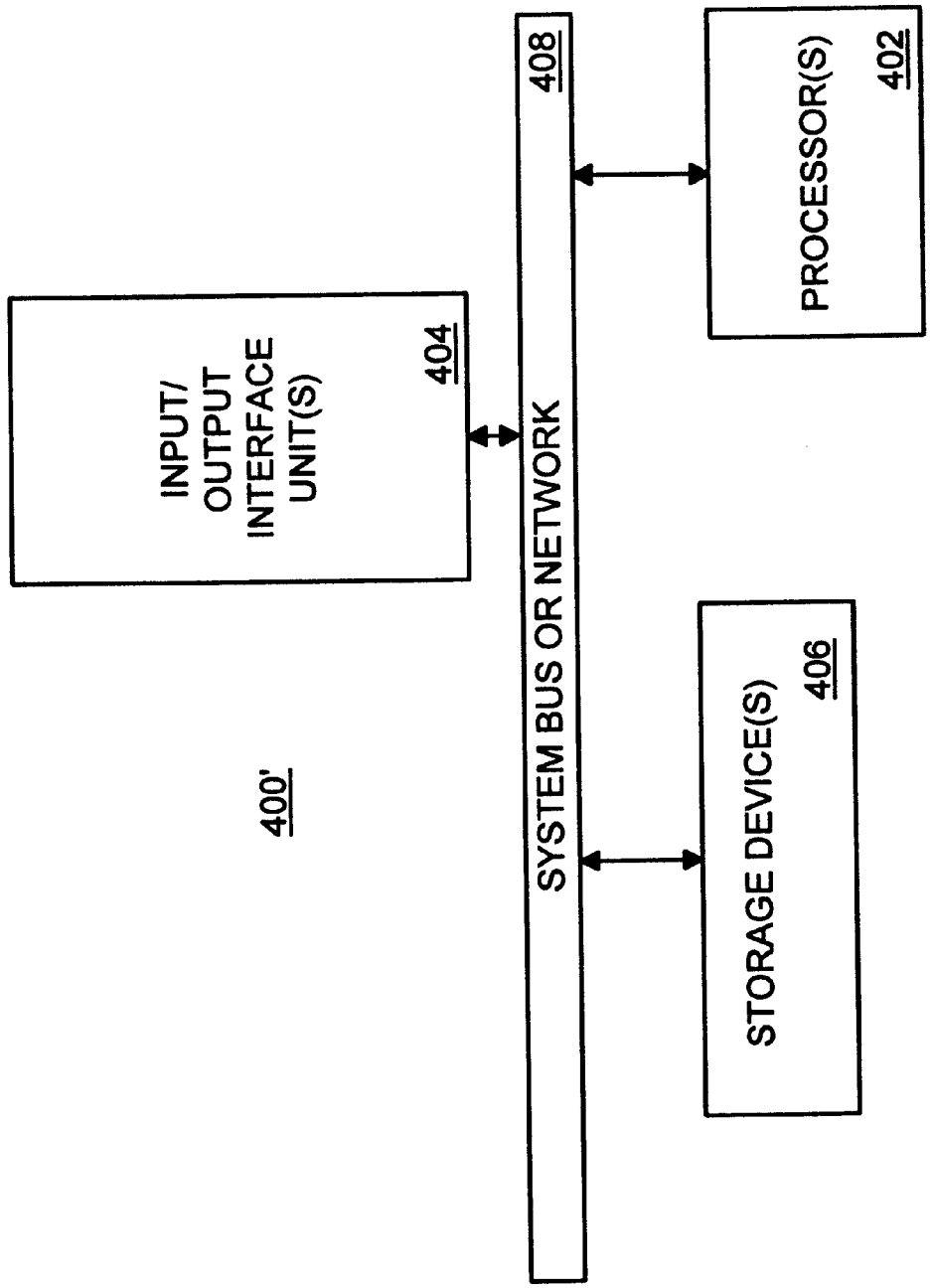

FIG. 4B depicts a more general machine 400' which may effect one or more of the processes discussed below. The machine 400' basically includes a processor(s) 402, an input/output interface unit(s) 404, a storage device(s) 406, and a system bus or network 408 for facilitating data and control communications among the coupled elements. The processor(s) 402 may execute machine-executable instructions to effect one or more aspects of the present invention. At least a portion of the machine executable instructions may be stored (temporarily or more permanently) on the storage devices (406) and/or may be received from an external source via an input interface unit 404.

§4.2.1.1 Exemplary Processes

Figure 5:
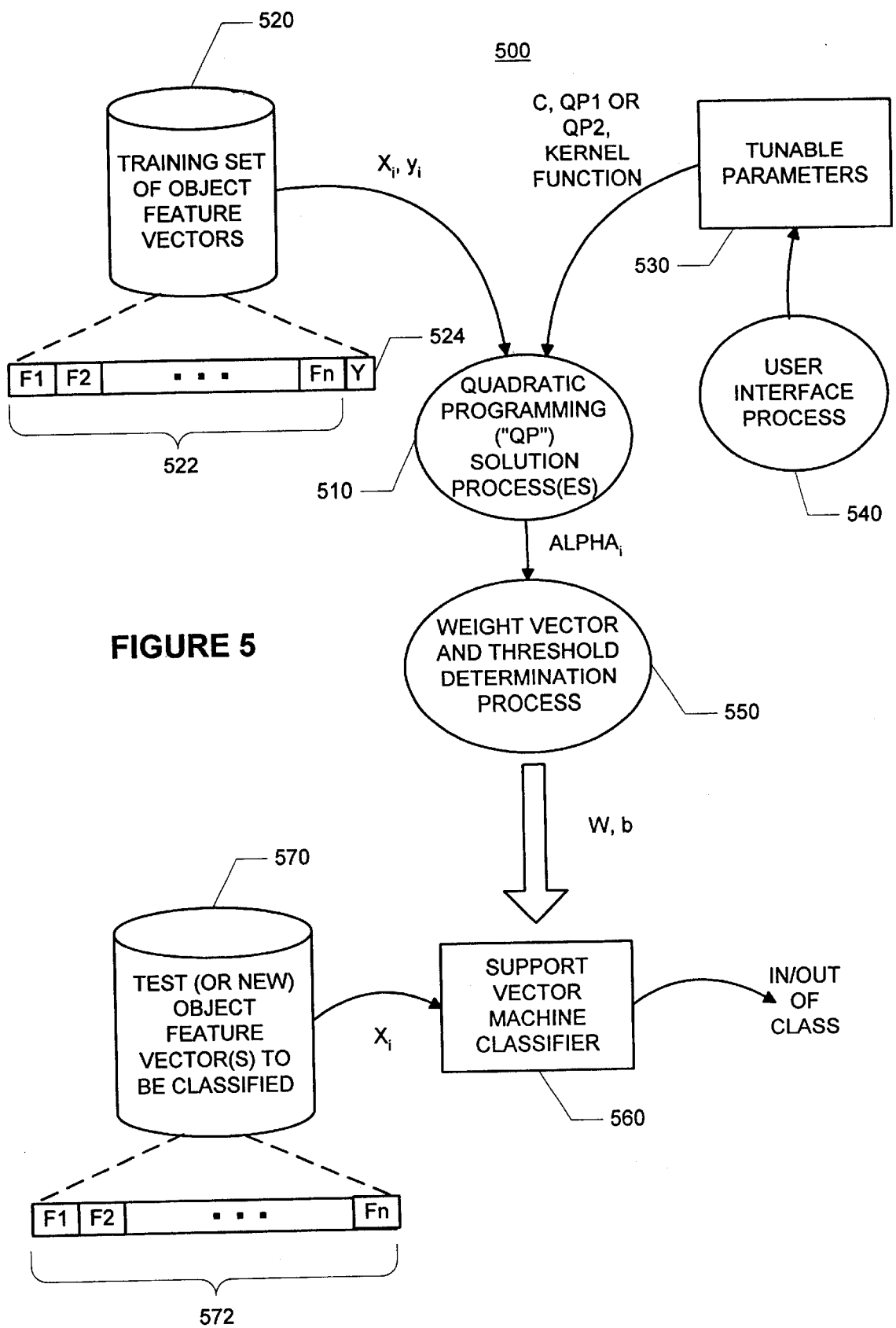
FIG. 5 is a diagram of processes and data which may be used by the present invention.

FIG. 5 is a high level diagram of processes of an environment 500 in which the present invention may be carried out. Basically, the present invention provides a process(es) 510 for solving quadratic programming problems (or more generally, a "QP solver"). The QP process 510 accepts data from a training set of object feature vectors 520. Each record of the training set may include a feature vector 522 of n features (also depicted as $x_i$), as well as an "in set" or "not in set" answer 524 (also depicted as $y_i$).

As discussed in the background above, the feature vectors of the training set may be non-separable. In these cases, slack parameters may be used to permit the non fitting data, as adjusted by the slack parameters, to be separable. Recall that, in such instances, a cost parameter "C" may be selected by a user such that a larger "C" corresponds to assigning a higher penalty to errors. As shown in FIG. 5, the cost parameter "C" is a tunable parameter 530 which may be selected, set, or changed, via a user interface process (or more generally, a "user interface") 540. The "C" parameter may be selected using a known cross-validation algorithm to determine a value of "C" which provides the best performance on a hold out set. To create a hold out set, the training set 520 is split into two parts, 520a and 520b. Part 520a is typically larger than 520b. The QP process 510 operates on part 520a for a fixed value of C. Each element in part 520b then gets tested (as if it were an object 570). The total performance over the set 520b is measured. Various values of C are tried and the value of C that yields the highest performance on set 520b is chosen. The QP process 510 is then re-applied to the entire set 520.

The tunable parameters 530 may also specify whether the quadratic problem is to have a linear equality constraint (i.e., a threshold value b) or not. The former case is referred to as "QP2" or "the second embodiment". The latter case is referred to as "QP1" or "the first embodiment". In addition, the tunable parameters 530 determine whether the support vector machine classifier 560 is linear, or non-linear with a pre-defined kernel function k.

Basically, the QP process(es) 510 of the present invention generates one Lagrange multiplier for each piece of training data i. A weight vector and threshold determination process (or more generally, a "weight and threshold generator") 550 determines the weight vector and the threshold easily from the determined Lagrange multipliers. More specifically:

$$\vec{w} = \sum_{i=1}^{n} y_i \alpha_i \vec{x}_i \qquad (15)$$

and $$b = \vec{w} \cdot \vec{x}_i - y_i \qquad (16)$$

where n is the number of training examples and i is any number from 1 to n.

Once the weight vector and threshold values are determined, the support vector machine is considered "trained" based on the training set of object feature vectors 520. Note that non-linear SVMs (recall those that use a kernel function for training) do not have a weight vector. Since the output O is defined as:

$$O = \sum_{i=1}^{nte} y_i \alpha_i k(\vec{x}_i, \vec{x}_{input}) - b$$

only the Lagrange multipliers ($\alpha_i$) and the threshold (b) need be determined.

Now, the support vector machine classifier, depicted as element 560 in FIG. 5, may be used to classify unknown objects based on their feature vectors. For example, unknown object(s) 570, defined by feature vectors 572, may be classified by the support vector machine 560. Also, a set of test feature vectors having known classifications may be used to test or validate the support vector machine classifier 560.

To reiterate, the present invention mainly concerns the QP process(es) 510. A first embodiment (or methodology) of the present invention, for solving a quadratic problem with bound inequality constraints and no linear equality constraint, is described in § 4.2.2 with reference to FIG. 6. A second embodiment (or methodology) of the present invention, for solving a quadratic problem with bound inequality constraints and a linear equality constraint, is described in § 4.2.3 with reference to FIG. 7.

§ 4.2.2 First Exemplary Methodology for Performing the Present Invention

§ 4.2.2.1 Overview

Figure 6:
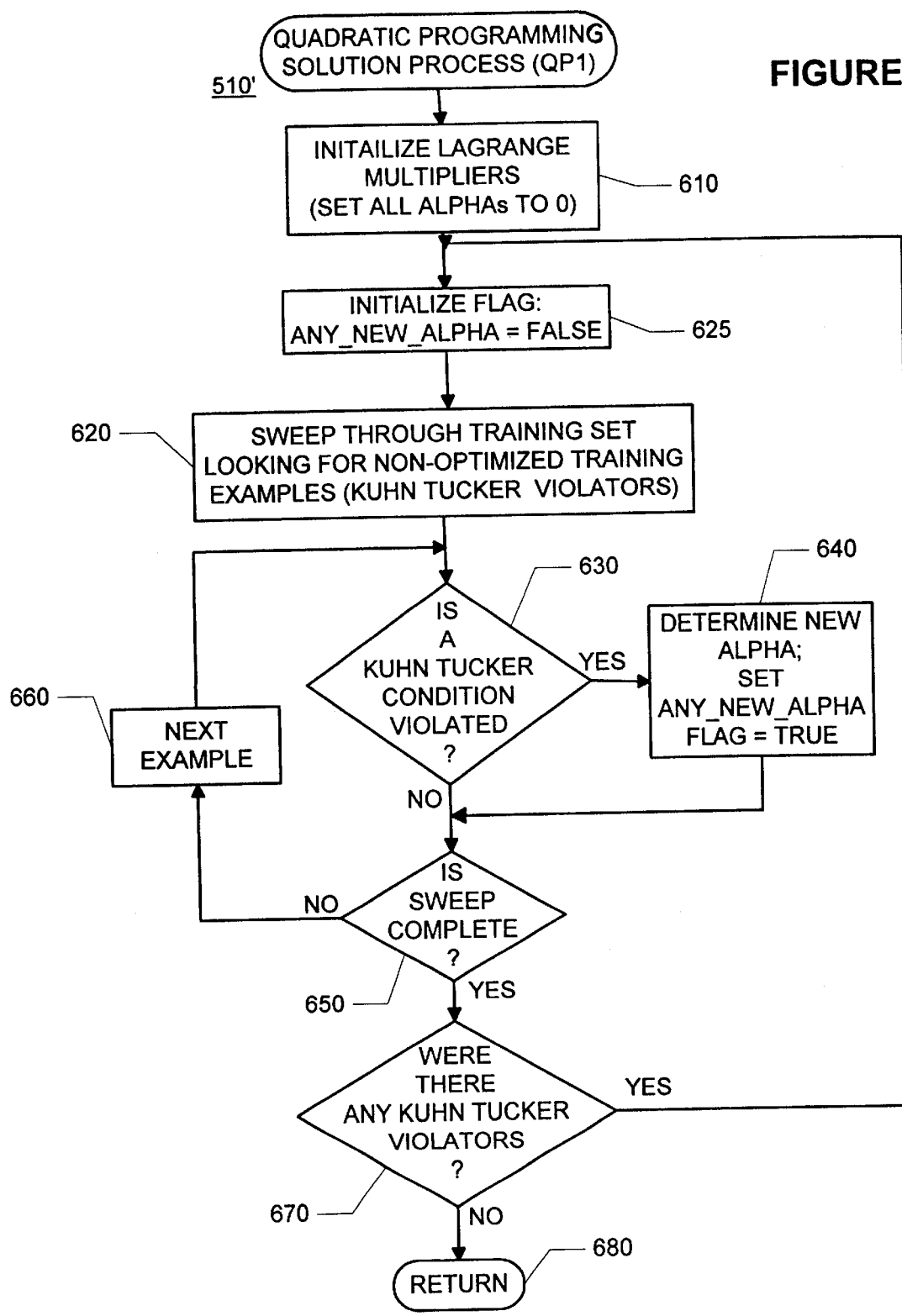
FIG. 6 is a high level flow diagram of a first exemplary methodology for performing an aspect of the present invention.

FIG. 6 is a high level flow diagram of a first exemplary embodiment of a QP process 510'. In this case, the QP process 510' is not subject to a linear equality constraint. That is, the threshold b is zero (0). First, as shown in step 610, the Lagrange multipliers, corresponding to each of examples of the training set, are initialized. Recall from expression (11) that training points beyond the margin, which is usually most of the training points, have a Lagrange multiplier equal to zero (0). Thus, for example, all of the Lagrange multipliers may be initialized by setting them to zero (0). Alternatively, the Lagrange multipliers may be initialized to other values, for example to random numbers between, and including, 0 and C. However, it is believed that initializing the Lagrange multipliers to zero (0) provides the fastest convergence when training SVMs.

As shown in steps 620, 625, 630, 650 and 660, for each training example from the set of training examples, it is determined whether the solution is optimized for the example. Step 625 initializes an "ANY_NEW_ALPHA" flag to "FALSE". The "ANY_NEW_ALPHA" flag is used to determine whether or not to terminate the algorithm at step 670.

Each example is examined for optimality by determining whether or not a Kuhn-Tucker condition is violated as shown in decision step 630. Recall that these conditions were set forth in expressions (11), (12), and (13) above. If, for example, the Lagrange multiplier for the $n^{th}$ training example is zero (0), then the solution is not optimal if $O_n y_n$ is less than or equal to one (1) as is stated in condition (11) above. If the solution is not optimal (e.g., if a Kuhn-Tucker condition is violated), then, as shown in step 640, a new Lagrange multiplier for the $n^{th}$ training example is determined. More specifically, the new Lagrange multiplier for the $n^{th}$ training example may be determined by the following expression:

$$\alpha_n^{new} = \alpha_n^{old} + \frac{Kuhn - Tucker\ Error}{k(\vec{x}_n, \vec{x}_n)} \qquad (17)$$

In the expression of equation (17), the Kuhn-Tucker Error may be expressed as:

$$1 - O_n y_n \qquad (18)$$

In the expression of equation (17), the denominator is the kernel function which, in the case of a linear support vector machine, is the dot product of the feature vectors x of the $n^{th}$ training example. Since the vectors $x_n$ are the same, the angle between them is zero (0) and the cosine of the angle is one (1).

The new Lagrange multiplier is then limited (or clipped) as follows:

$$\alpha_n^{new,clipped} = \begin{cases} 0 & \text{if } \alpha_n^{new} < 0 \\ \alpha_n^{new} & \text{if } 0 \le \alpha_n^{new} \le C \\ C & \text{if } \alpha_n^{new} > C \end{cases} \quad (19)$$

so that the inequality constraints are fulfilled. After step 640, step 645 sets the "ANY_NEW_ALPHA" flag to "TRUE".

Once the sweep through a set of training examples is complete, step 670 determines whether any of the Lagrange multipliers have changed during the sweep (e.g., if the ANY_NEW_ALPHA flag is TRUE). If so, then other examples may now violate the Kuhn-Tucker conditions. More specifically, as the Lagrange multipliers are adjusted, the separating hyperplane (or hypersurface) of the SVM changes. That is, as can be seen from equation (15), in the case of linear SVMs, as the Lagrange multipliers ($\alpha$) change, the weight vector w changes. Since the actual output of the SVM is a function of the weight vector w in the case of linear SVMs and of the Lagrange multipliers in the case of all SVMs, the change in Lagrange multipliers will change the values of the outputs $O_n$. Hence, another sweep through the data is carried out by branching control back to step 625. If no Lagrange multipliers were changed (i.e., if the ANY_NEW_ALPHA flag=FALSE), then all the examples must fulfill the Kuhn-Tucker conditions and the QP process is terminated at return node 680.

Appendix A lists pseudo code which may be used for effecting this first exemplary embodiment (with some modifications) of a QP process. In the pseudo code, the line numbers are used solely as references. Line (1) defines a target value as the desired output $y_i$, where i=1, ..., number of training examples. Line (2) defines point as the $i^{th}$ training feature vector $x_i$ of the matrix X composed of the training feature vectors. Line (3) defines alpha as the initialized Lagrange multipliers.

Lines (10) and (11), in conjunction with lines (4), (5), (32), and (33), control whether the QP process sweeps through the entire training set or just through the non-boundary examples (the boundary examples are examples where alpha is zero (0) or C. An initial sweep processes all examples of the training set. Assuming that a Lagrange multiplier was changed, the next sweep processes only the non-boundary examples of the training set. Subsequent sweeps also process only the non-boundary Lagrange multipliers until no Lagrange multipliers change. Then, the next sweep processes the entire set of training examples. If no Lagrange multipliers were changed, then processing ends. If, on the other hand, a Lagrange multiplier was changed, the processing continues as discussed above. The reason for processing only non-boundary Lagrange multipliers on at least some sweeps through the set of training examples can be appreciated after reviewing FIGS. 8A through 10B.

The cross-sectional side view of FIG. 8A and the plan view of FIG. 8B depict an objective function 800 to be minimized and inequality constraints on the Lagrange multiplier at zero (0) 810 and C 820. The optimized Lagrange multipler is zero (0). As can be seen from FIGS. 8A and 8B, if a Lagrange multiplier is at the zero (0) constraint 810, it is likely to remain "stuck" at zero (0) constraint 810 even if the objective function 800 shifts somewhat. Similarly, the cross-sectional side view of FIG. 10A and the plan view of FIG. 10B depict an objective function 1000 to be minimized and linear constraints on the Lagrange multiplier at zero (0) 1010 and C 1020. The optimized Lagrange multiplier is at C. As can be seen from FIGS. 10A and 10B, if a Lagrange multiplier is at the C constraint 1020, it has likely to remain "stuck" at the C constraint 1020 even if the objective function 1000 shifts somewhat. Finally, the cross-sectional side view of FIG. 9A and the plan view of FIG. 9B depict an objective function 900 to be minimized and linear constraints on the Lagrange multiplier at zero (0) 910 and C 920. As can be seen from FIGS. 9A and 9B, if the Lagrange multiplier is between 0 and C, the objective function 900 can shift by a small amount and cause the Lagrange multiplier to become non-optimal.

Naturally, each sweep could process all of the training examples in the alternative. Indeed, the flow diagram of FIG. 6 depicts this alternative "sweeping" methodology. Lines (12), (13), and (14) determine whether any Kuhn-Tucker conditions are violated. More specifically, line (12) evaluates the SVM at a point "I". For linear SVMs, this evaluation involves taking a dot product between the weight vector w and a training example vector $x_i$. For non-linear SVMs, this evaluation involves summing, over all points "j", the products of the target ($y_j$), the alpha ($\alpha_j$), and the kernel function between the $I^{th}$ point and the $j^{th}$ point $k(x_i,x_j)$. Alternatively, since any $y_j\alpha_j k(x_i,x_j)$ product in which $\alpha_j$ is zero (0), is zero (0), only the points where $\alpha_j \ne 0$ need be considered in the evaluation. In this way, computational resources may be saved. Line (13) determines a Kuhn-Tucker Error value as used in equation (17) for example.

If a Kuhn-Tucker condition is violated, lines (15) through (28) determine a new Lagrange multiplier. Recall, for example, step 640 of FIG. 6 which determined a new Lagrange multiplier when a Kuhn Tucker condition was violated. At line (16), the kernel function is a dot product if the SVM is linear.

§ 4.2.2.2 Optimization for Linear SVMs

Lines (23) through (27) provide an optimization for linear SVMs. In this case, the entire SVM state is stored as a weight vector rather than a weighted sum of kernels. The weight vector is directly updated when the Lagrange multiplier is changed. That is:

$$\vec{w} = (\alpha_i^{new} - \alpha_i^{old}) y_i \vec{x}_i \quad (20)$$

§4.2.2.3 TOLERANCE FOR KT CONDITIONS

Lines (14) and (15) check or a violation of the Kuhn-Tucker conditions on point[I]. The condition is checked using interval arithmetic: namely, if the condition is approximately met within a certain tolerance, then condition is met. In the embodiment shown, the tolerance ("tol") is set to 1e-3. This should be accurate enough for recognition machines, and will prevent the method from spending a large amount of computational resources generating unneeded precision in the Lagrange multipliers.

§4.2.2.4 OPTIMIZATION FOR CLASSIFYING TEXT

When the input points consist of sparse binary vectors (e.g., the object to be classified has relatively few of many possible features), the embodiment shown can be dramatically sped up by using a sparse evaluation of the dot product. Namely, the dot product between the weight and the input point is the sum of the weight elements that correspond to the non-zero input dimensions. This can be expressed as:

$$\vec{w} \cdot \vec{x}_i = \sum_{\substack{f=\text{all non-zero} \\ \text{features of vector } \vec{x}_i}} \vec{w}_f \qquad (21)$$

This optimization is useful for training linear SVMs to be used for text classification since most text objects are represented by sparse feature vectors (e.g., text objects have relatively few of all words of a feature vector).

§4.2.2.5 ALPHA VECTOR OPTIMIZATION

In the embodiment shown, the alpha vector, which includes the values of the Lagrange multipliers for all training examples, is stored as a vector of length equal to the size of the training set. That is:

$$\vec{\alpha} = \alpha_1, \ldots \alpha_{nte} \qquad (22)$$

wherein "nte" is the number of training examples.
Since, as stated above, most of the Lagrange multipliers will be zero (0), the alpha vector may be stored as two (2) vectors of length equal to the number of non-zero Lagrange multipliers, one storing the identity (index) of the non-zero Lagrange multipliers, the other storing the value of the non-zero Lagrange multiplier. When this optimization is used, the loop at line (8) would not always loop over all training examples: when examineAll is 0, it could loop over the non-zero Lagrange multipliers. In this case, the if statement at line (10) would only need to check for alpha=C.

§4.2.3 SECOND EXEMPLARY METHODOLOGY FOR PERFORMING THE PRESENT INVENTION

§4.2.3.1 OVERVIEW

FIG. 7, which consists of FIGS. 7A and 7B, is a high level flow diagram of a second exemplary embodiment of a QP process 510". In this case, the QP process 510" is subject to a linear equality constraint. First, as shown in step 710, the Lagrange multipliers, corresponding to each of examples of the training set, are initialized. Recall that, since most of the Lagrange multipliers may be zero (0), all of the Lagrange multipliers may be initialized by setting them to zero (0) for example. Although, the Lagrange multipliers may be initialized to some other number(s), such as random numbers between, and including, 0 and C, for example, it is believed that the process will finish faster if they are all initialized to zero (0).

As shown in steps 720, 725, 740, 748, and 749, for each training example from the set of training examples, it is determined whether a Kuhn-Tucker condition is violated. As shown in step 742, if a Kuhn-Tucker condition is violated, another example is selected from the training set (as will be discussed below), thereby creating a pair of Lagrange multipliers to be jointly optimized. In step 744, an attempt is made to determine new Lagrange multipliers such that the examples are jointly optimized. In decision step 746, it is determined whether the examples were optimized. If they were not optimized, processing branches back to step 742 where another feature vector is selected from the training set thereby creating another pair of Lagrange multipliers. If, on the other hand, the examples were optimized, processing continues at step 747 where the ANY_NEW_ALPHA flag is set to TRUE.

The first step in the joint optimization (recall step 744) of the two (2) Lagrange multipliers is to determine the bounds on one of the variables. Either the first or the second multiplier can be bounded. We choose the second arbitrarily. Let L be the lower bound on the second Lagrange multiplier and H be the higher bound on the second Lagrange multiplier. Let $y_1$ be the desired output of the first example and let $y_2$ be the desired output of the second example. Let $\alpha_1$ be the current value of the first Lagrange multiplier and $\alpha_2$ be the current value of the second Lagrange multiplier. If $y_1$ is the same as $y_2$, then the following bounds are computed:

$$H = \min(C, \alpha_1 + \alpha_2) \quad L = \max(0, \alpha_1 + \alpha_2 - C) \qquad (23)$$

If $y_1$ is the opposite sign as $y_2$, then the bounds are computed as follows:

$$H = \min(C, C - \alpha_1 + \alpha_2) \quad L = \max(0, \alpha_2 - \alpha_1) \qquad (24)$$

If the value L is the same as the value H, then no progress can be made and decision step 746 determines that the training examples were not optimized and processing continues at step 742.

The new optimized value of $\alpha_2$ may be computed via the formula:

$$\alpha_2^{new} = \alpha_2 + \frac{y_1 y_2 KT\ ERROR_1 - KT\ ERROR_2}{k(\vec{x}_1, \vec{x}_1) + k(\vec{x}_2, \vec{x}_2) - 2k(\vec{x}_1, \vec{x}_2)} \qquad (25)$$

If the new value of the second Lagrange multiplier is less than L, then it is set to L. Conversely, if the new value of the second Lagrange multiplier is greater than H, then it is set to H. If the new clipped (or limited) value of the second Lagrange multiplier is the same as the old value, then no optimization is possible and decision step 746 determines that the training examples were not optimized and processing continues at step 742. Otherwise, the new value of the first Lagrange multiplier is then derived from the clipped (or limited) value of the second Lagrange multiplier:

$$\alpha_1^{new} = \alpha_1 + y_1 y_2 (\alpha_2 - \alpha_2^{new.clipped}) \qquad (26)$$

If the support vector machine is linear, then the weights and thresholds are updated to reflect the new Lagrange multipliers so that other violations of the Kuhn Tucker conditions can be detected. To reiterate, if the examples can be optimized, step 747 sets the "ANY_NEW_ALPHA" flag to "TRUE".

The second Lagrange multiplier pair may be selected (recall step 742) based on the following heuristic. The ideal second Lagrange multiplier would change the most upon joint optimization. An easy approximation to the change upon optimization is the absolute value of the numerator in the change in the second Lagrange multiplier:

$$|y_1 y_2 KT\ ERROR_1 - KT\ ERROR_2| = |(O_1 - y_1) - (O_2 - y_2)| \qquad (27)$$

If the true error $(O_1 - y_1)$ of the first Lagrange multiplier is positive, then a second Lagrange multiplier that has a large negative true error $(O_2 - y_2)$ would be a good candidate for joint optimization. If the first true error is negative, then a second Lagrange multiplier that has a large positive true error would be a good candidate for optimization. Therefore, the QP process seeks out a non-boundary Lagrange multiplier ($\alpha \neq 0$ or C) that has a true error that is the most opposite of the true error of the first Lagrange multiplier.

There are some degenerate cases where different examples have the same input feature vectors. Referring to expression (25) above, in such instances, the denominator would become zero (0). This could prevent the joint optimization from making forward progress. These redundant examples could be filtered out. However, the embodiment depicted in the pseudo code of Appendix B contains a hierarchy of heuristics to find a second example to make forward progress on the joint optimization step. If the first heuristic described above fails, the QP process will select a non-boundary Lagrange multiplier as the other Lagrange multiplier of the pair to be jointly optimized. If this heuristic fails, any of the other Lagrange multipliers may be selected as the other Lagrange multiplier of the pair. Under the extremely degenerate case when no pairwise optimization will cause forward progress for the first Lagrange multiplier, step 742 gives up and control flows to step 748 (Since such instances are relatively rare, the flow from step 742 to 748 has not been shown in FIG. 7A to simplify the drawing).

Once the sweep through the set of training examples is complete, step 750 checks to see if the "ANY_NEW$_{13}$ALPHA" flag is "TRUE". If it is, then one or more Lagrange multipliers changed with the sweep through the entire data set. In this case, control flows through node A 752 to step 765 and the non-boundary Lagrange multipliers are then optimized. If the "ANY_NEW_ALPHA" flag is "FALSE", then all of the examples obey the Kuhn-Tucker conditions and the QP process is terminated via return node 780.

Steps 760, 765, 770, 778, and 779 sweep through the non-boundary (i.e., α≠0 or C) feature vectors of the training set. Another Lagrange multiplier is selected as shown in step 772. The hierarchical heuristic discussed above with reference to step 742 may also be used here. Steps 774, 776, and 777 are similar to steps 744, 746, and 747, respectively. When the sweep is complete, step 785 determines whether any of the non-boundary Lagrange multipliers changed (i.e., if the ANY_NEW_ALPHA flag is TRUE). If they did, then the Kuhn-Tucker conditions may be violated on the non-boundary set and control flows back to step 765. If, on the other hand, all of the non-boundary Lagrange multipliers obey the Kuhn Tucker conditions (i.e., if the ANY_NEW_ALPHA flag is FALSE), then the process will sweep over the entire set, looking for Kuhn-Tucker violations on the entire set that arose from the optimization on the non-boundary subset. As can been appreciated from FIG. 7, this process 510" first sweeps through all training examples of the training set. Assuming that a Lagrange multiplier was changed, the next sweep processes only the non-boundary training examples of the training set. Subsequent sweeps also process only the non-boundary Lagrange multipliers until no Lagrange multipliers change. Then, the next sweep processes the entire set of training examples. If no Lagrange multipliers change, processing ends. If, on the other hand, a Lagrange multiplier changes, the processing continues as discussed above. This is similar to the alternative embodiment of the process QP1 510' discussed above in §4.2.2.1. Naturally, in an alternative methodology, all training examples of the training set could be processed on every sweep.

The plan view of FIG. 11, which is similar to FIG. 8B, depicts a function 1100 to be minimized, subject to inequality constraints to zero (0) 1110A1 and 1110A2 and C 1120A1 and 1120A2, as well as additional constraints where $y_1 \neq y_2$ 1130 and where $y_1 = y_2$ 1140. The plan view of FIG. 12, which is similar to FIG. 9B, depicts a function 1200 to be minimized, subject to linear constraints at zero (0) 1210A1 and 1210A2 and C 1220A1 and 1220A2, as well as constraints where $y_1 \neq y_2$ 1230 and where $y_1 = y_2$ 1240. Finally, the plan view of FIG. 13, which is similar to FIG. 10B, depicts a function 1300 to be minimized, subject to linear constraints to zero (0) 1310A1 and 1310A2 and C 1320A1 and 1320A2, as well as constraints where $y_1 \neq y_2$ 1330 and where $y_1 = y_2$ 1340. As can be seen from these Figures, the second exemplary embodiment jointly solves a pair of Lagrange multipliers to ensure that they stay on the line defined by constraint 1130/1230/1330 or 1140/1240/1340.

Appendix B lists pseudo code which may be used for effecting this second exemplary embodiment (with some modifications) of a QP process. In the pseudo code, the line numbers are used solely as references. The pseudo code of Appendix B includes three (3) routines. Lines 102 through 118 define a main routine which loops through a set of training examples. The main routine calls an examineExample routine. Lines 73 through 100 define the examineExample routine which finds a second training example to jointly optimize with the first. The examineExample routine calls a takeStep routine. Lines 4 through 71 define the takeStep routine which performs, if possible, the actual joint optimization. Basically, the takeStep routine determines whether Lagrange multipliers associated with two (2) chosen training examples can be made to converge towards an optimum value. Each of these three (3) routines, as well as variations thereto, will be discussed in more detail below.

Before discussing the pseudo code of Appendix B, processes with may be carried out by the exemplary second embodiment of the present invention are depicted in FIG. 14. A "process" may be one or more machine executable instructions, executed on a machine. Process 1410 corresponds to the "main" routine of the pseudo code of Exhibit B. Process 1420 corresponds to the "examineExample" routine of the pseudo code of Exhibit B. Finally, process 1440 corresponds to the "takeStep" routine of the pseudo code of Exhibit B.

In the process 1410, a sweep selection and control process (or more generally, a "sweep controller") 1416 activates either the process 1414 for sweeping through all training examples or the process 1412 for sweeping through all non-boundary training examples. These processes, 1412 or 1414, get a first training example "TE_1" from the training set 520 and provides it to a pairing process 1422. The pairing process (or more generally, a "pairing facility") 1422 determines the Lagrange multiplier "ALPHA_1" associated with the first training example "TE_1" and selects another Lagrange multiplier "ALPHA_2", in accordance with some selection criteria, of a second training example "TE_2". The decision criteria of the pairing process 1422 may consider real errors, in which case cached real errors 1430 associated with the Lagrange multipliers may be accessed via a cache management process 1424.

Once two Lagrange multipliers, "ALPHA_1" and "ALPHA_2", are selected, a joint optimization process (or more generally, a "joint optimizer") 1444 may be used to attempt to jointly optimize the paired Lagrange multipliers. If joint optimization is possible, the new Lagrange multipliers, "NEW_ALPHA_1" and "NEW_ALPHA_2" are then stored at 1450. Processing is then resumed by the sweep selection and control process 1416 which, via process 1412 or 1414, selects another first example "TE_1". If, on the other hand, the paired Lagrange multipliers cannot be jointly optimized, the optimization check process (or more generally, a "checker") 1442 reports this failure to the pairing process 1422, thereby requesting another pair of Lagrange multipliers. The pairing process 1422 then selects another training example "TE_2" to pair with the same first training example "TE_1". Now, the specific lines of the pseudo-code of Exhibit B will be addressed.

§4.2.3.2 CONTROLLING PROCESSING "SWEEPS"

In one embodiment, the main routine alternates one sweep through all of the training data (lines (109) and (110))

(Recall process 1414 of FIG. 14.) with multiple sweeps through the non-boundary (i.e., non-zero and non-C) Lagrange multipliers (Recall process 1412 of FIG. 14.) until all such non-boundary Lagrange multipliers obey the Kuhn-Tucker conditions (lines (112) and (113)). Note that lines (110) and (113) invoke the examineExample routine. Naturally, other sweeps may be used instead. For example, to simplify the program, though at the expense of execution speed, each sweep may go through all the training examples of the training set.

§4.2.3.3 STORING AN ARRAY OF LAGRANGE MULTIPLIERS

In the examineExample routine, the Lagrange multipliers can be stored as a either one array having a size corresponding to the number of training examples (also referred to as "the full array") or two (2) arrays that represent a larger sparse array. If the full array is used, then lines (6) and (75) are simply array references. If, on the other hand, a sparse array is used, then the routines will have access to two (2) parameters; namely (i) an index of the example in the training set, and (ii) an index of the example in the sparse array of non-zero Lagrange multipliers (or −1 if the example has a zero Lagrange multiplier and does not belong in the sparse array). In this case, lines (6) and (75) will either return a zero (0) if the sparse array index is less than zero (0) or look up the example in the sparse array. Furthermore, the loops on lines (86) and (112) can be modified to loop over the indexes of the sparse array.

§4.2.3.4 CACHING REAL ERRORS

Still referring to the examineExample routine, the real error mentioned on line (76) (and on line (8) in the takeStep routine) is the desired output of the SVM less the actual output of the SVM ($y_i - O_i$). In the depicted embodiment, these real errors are cached for the examples that have a non-boundary (i.e., non-zero or a non-C) Lagrange multiplier. (Recall cache 1430 of FIG. 14.) Thus, lines (8) and (76) first determine if the Lagrange multiplier of the training example is non-zero and non-C. If so, the examineExample routine then returns the real error in the stored error cache. Otherwise, the examineExample routine will compute the real error as described above. Caching the real errors allows an example to be intelligently chosen at line (82). That is, as discussed above, Lagrange multipliers at a boundary are less likely to violate the Kuhn-Tucker conditions. If the real errors are cached, line (67) of the takeStep routine is used to compute the errors.

§4.2.3.5 PAIRING LAGRANGE MULTIPLIERS FOR JOINT OPTIMIZATION

As stated above, the examineExample routine uses a heuristic for identifying a second training example "i1" to jointly optimize with training example "i2" (Recall process 1422 of FIG. 14.) Though the heuristic embodied in examineExample is believed to work well, those skilled in the art will recognize that other methods for selecting a second Lagrange multiplier are possible.

In the examineExample routine, like (78) checks to see if training example "i2" violates a Kuhn-Tucker condition. If it does, then the Lagrange multipliers, associated with training examples "i1" and "i2", will be modified. Otherwise, the procedure examineExample is finished and will return a zero (0) as shown in line (99). Line (82) chooses a second Lagrange multiplier ($\alpha_1$) to be optimized in conjunction with the Lagrange multiplier ($\alpha_2$) passed to the examineExample routine. In one embodiment, one of the non-boundary (i.e., non-zero and non-C) Lagrange multipliers is selected for optimization. Errors are cached for such Lagrange multipliers (Recall cache 1540 of FIG. 14.). If the error (e2) for training example "i2" is greater than zero (0), then line (82) may select the Lagrange multiplier with the most negative cached error. If the error (e2) is less than zero, then line (82) may select the Lagrange multiplier with the most positive cached error. In this way, training examples are paired such that the real errors of the Lagrange multipliers associated with the training examples will cancel, at least to some extent.

At line (83), a step is attempted (i.e., joint optimization of the Lagrange multipliers is attempted) using the example chosen at line (82) by calling the takeStep routine. If the joint optimization succeeds (i.e., the Lagrange multipliers were changed by the takeStep routine), then the examineExample routine will return a "1", thereby signaling that the Lagrange multipliers changed. If, on the other hand, the joint optimization fails at line (83), then lines (86) through (91) sweep through all of the non-boundary (i.e., non-zero and non-C) Lagrange multipliers (not just those with the largest error), trying to jointly optimize the Lagrange multiplier associated with training example "i2" with each one (Recall processes 1442 and 1422 of FIG. 14.). If one of the joint optimizations succeed, then the examineExample routine returns a "1". Otherwise, control flows to lines (92) through (97), where a joint optimization is attempted with every example in the training set. Again, if any of these joint optimization attempts succeeds, then the examineExample routine returns a "1". If all of these joint optimization attempts fail, the SVM objective function is very degenerate. The examineExample routine will return a "0" and the next example of the training set will become "i2". The loops at lines (86) through (91) and lines (92) through (97) may start at a random location in the appropriate array, then loop, wrap around from the last element of the array to the first element of the array, and stop when every appropriate example is tried. The random starting location prevents a bias towards examples early in the training set.

To reiterate, the above heuristic for pairing Lagrange multipliers for an attempted joint optimization is just one exemplary hueristic. Other selection methods will be apparent to those skilled in the art.

§4.2.3.6 BOUNDS ON THE JOINT OPTIMIZATION

Referring now to the takeStep routine, lines (11) through (24) compute the lowest ("L") and highest ("H") possible value for the second Lagrange multiplier ($\alpha_2$) after the joint optimization. These values are computed so that at the end of the joint optimization, both Lagrange multipliers obey the linear equality constraints (see equation (6) above) and the bound constraints (see expression (10) above). Line (25) determines whether "L" is the same as "H". If so, no progress can be made (i.e., the pair Lagrange multipliers cannot be jointly optimized) and the testing routine returns a "0" (indicating failure to optimize) (Recall process 1442 of FIG. 14.).

§4.2.3.7 JOINT OPTIMIZATION

Lines (27) through (29) compute three (3) kernel function values used for optimizing the SVM for training examples "i1" and "i2". Recall that if the SVM is linear, then these kernel functions are simply the dot product between the corresponding training examples. If, on the other hand, the SVM is non-linear, then these kernel functions are the appropriate kernel functions for the non-linear SVM. If the input is sparse, the speed of the overall method can be increased by computing the linear (or non-linear) kernels with known sparse processing techniques.

Line (31) computes the second derivative of the quadratic form (see equation (7) above) in the direction of the linear equality constraint (see equation (6) above). This value is stored in the variable convx. If the quadratic form is positive definite (as is the case for most real problems), then convx should be greater than zero (0). If so, lines (34) through (36) compute the new optimum for the second Lagrange multiplier ($\alpha_2$) and stores the new optimum in the variable a2. When point[i1] is equal to point[i2] (even for "i1" not equal to "i2"), then convx may be zero (0). In this case, lines (40) through (51) force the constrained minimum to the boundaries of the feasible region. More specifically, lines (40) through (51) compute the objective function at both boundaries and chosen a point with the lowest objective function. If the objective function is the same at both boundaries, then no progress can be made on this step and the new "i2" Lagrange multiplier is set to be the old "i2" Lagrange multiplier. The objective functions may be compared using an inexact comparison (See, e.g., line (46)), as is known in the numerical analysis art.

Line (53) determines whether the Lagrange multiplier of training example "i2" ($\alpha_2$) has changed, for example, by using inexact comparison. If the Lagrange multiplier of training example "i1" ($\alpha_2$) has not changed, then the joint optimization has failed and the takeStep routines returns a "0".

Line (55) changes the Lagrange multiplier of training example "i1" to the new optimum ("a1") by ensuring that the linear equality constraint (see equation (6) above) is fulfilled after the joint optimization.

Lines (58) and (59) compute the threshold b from the Kuhn-Tucker conditions. The threshold at line (58) is only valid if the Lagrange multiplier of training example ("a1") is not at the bounds zero and C (which is checked at line (60)). The threshold at line (59) is only valid if the Lagrange multiplier of the training example ("a2") is not at the bounds (which is checked at line (62)). If both Lagrange multipliers are at the bounds, then the threshold b is allowed to vary over an interval bounded by the variables b1 and b2 computed at lines (58) and (59), respectively. In one embodiment, the threshold b is chosen to be the average of these two values.

§4.2.3.8 UPDATING A WEIGHT VECTOR

In one embodiment, for a linear SVM, the method effected by the pseudo code of Appendix B stores the linear SVM as one weight vector, rather than as a linear superpositions of a set of input points. Therefore, line (66) adds the vector whose elements are a1change*point[i1]+a2change*point[i2] to the weight vector. If the input vector is sparse, the update to the weight vector can be accomplished in a known sparse manner, also.

§4.2.3.9 UPDATING REAL ERRORS

Line (67) of the takeStep routine updates the value of the cached rear error for the non-zero and non-C Lagrange multipliers. For linear SVMs, the change in the weight vector is computed at line (66). More specifically, the change in the error of an example is simply the dot product of the change in the weight vector with the input point for the example. For a non-linear SVM, the change in the error for example "ex" is simply a1change*kernel(point[i1],point[ex])+a2change* kernel(point[i2],point[ex]). For the two Lagrange multipliers that have been jointly optimized, if the Lagrange multipliers is away from the bounds 0 and C, then the cached error should be reset to zero, because the Kuhn-Tucker conditions hold after the joint optimization. Again, for sparse input vectors, the errors can be updated in a sparse manner. In one embodiment, the error cache is stored as a sparse vector, having an index array and a value array.

§4.2.3.10 STORING LAGRANGE MULTIPLIERS

Lines (68) and (69) of the takeStep routine store the newly computed Lagrange multipliers in the "alpha" array. If the "alpha" array is a full array, then line (68) and (69) simply perform array de-referencing. If the "alpha" array is a sparse array, then to set an element of the "alpha" array, the index array must first be searched for "i1" (or "i2"). If "i1" (or "i2") is in the index array, then the corresponding value array element can be set to the optimize Lagrange multiplier "a1" (or "a2"). Otherwise, the index "i1" (or "i2") is added to the index array and a new value is added to the value array. If the "alpha" array is sparse, then the examineExample routine may have already found the corresponding index elements for "i1" and "i2"—hence no real searching is needed. In this case, the index array is stored in sorted order.

§4.3 CONCLUSION

In view of the foregoing, new methods for training SVMs are disclosed. These methods use analytic computations, rather than numerical methods, for solving quadratic programming problems associated with training SVMs. These methods may be used with non-separable training data, as well as SVMs with non-linear separation boundaries.

---

APPENDIX A
© John Platt 1998

```
1)   target = desired output vector (length = trainingSetSize)
2)   point = training point matrix (point[I] is the ith training point)
3)   alpha = vector of Lagrange multipliers
4)   numChanged = 1
5)   examineAll = 1
6)   while (numChanged || examineAll)
7)   {
8)       for I = 1 to trainingSetSize
9)       {
10)          if (!examineAll && (alpha[I] == 0 || alpha[I] == C))
11)              skip to next example;
12)          g = eval SVM on point[I]
13)          r = 1-g*target[I]
14)          if ((r < -tol && alpha[I] < C) || (r > tol && alpha[I] > 0))
15)          {
16)              overlap = Kernel(point[I],point[I])
17)              delta = r/overlap
18)              newalpha = alpha[I]+delta
19)              if (newalpha < 0)
20)                  newalpha = 0
21)              else if (newalpha > C)
22)                  newalpha = C
23)              if (kernel is linear)
24)              {
25)                  delta = newalpha - alpha[I]
26)                  weight vector += delta*target[I]*point[I]
27)              }
28)              alpha[I] = newalpha
29)              numChanged++
30)          }
31)      }
32)      if (examineAll) examineAll = 0
33)      else if (numChanged == 0) examineAll = 1
34) }
```

APPENDIX B
© John Platt 1998

```
1)    target = desired output vector (length = sizeTrainingSet)
2)    point = training point matrix (length = sizeTrainingSet)
3)    y1 = target[i1]
4)    procedure takeStep(i1,i2)
5)        if (i1 == i2) return 0
6)        alph1 = Lagrange multiplier for i1
7)        y1 = target[i1]
8)        r1 = (real error for i1)*y1
9)        s = y1*y2
10)       delta = alph1+s*alph2
11)       if (s > 0)
12)       {
13)           L = delta−C
14)           if (L < 0) L = 0
15)           H = delta
16)           if (H > C) H = C
17)       }
18)       else
19)       {
20)           L = −delta
21)           if (L < 0) L = 0
22)           H = C−delta
23)           if (H > C) H = C
24)       }
25)       if (L == H)
26)           return 0
27)       k11 = kernel(point[i1],point[i1])
28)       k12 = kernel(point[i1],point[i2])
29)       k22 = kernel(point[i2],point[i2])
30)       oldb = b
31)       convx = k11+k22−2*k12
32)       if (convx > 0)
33)       {
34)           a2 = alph2 + (s*r1−r2)/convx
35)           if (a2 < L) a2 = L
36)           else if (a2 > H) a2 = H
37)       }
38)       else
39)       {
40)           f1 = r1−alph1*k11−s*alph2*k12+y1*b
41)           f2 = r2−s*alph1*k12−alph2*k22+y2*b
42)           L1 = delta−s*L
43)           H1 = delta−s*H
44)           loCost =
              L1*f1+L*f2+0.5*L1*L1*k11+0.5*L*L*k22+s*L*L1*k12
45)           hiCost =
              H1*f1+H*f2+0.5*H1*H1*k11+0.5*H*H*k22+s*H*H1*k12
46)           if (|loCost−hiCost| < eps*(|loCost|+|hiCost|+eps))
47)               a2 = alph2
48)           else if loCost < hiCost
49)               a2 = L
50)           else
51)               a2 = H
52)       }
53)       if (|a2−alph2| < eps*(a2+alph2+eps))
54)           return 0
55)       a1 = delta−s*a2
56)       a1change = y1*(a1−alph1)
57)       a2change = y2*(a2−alph2)
58)       b1 = y1*r1+a1change*k11+a2change*k12+oldb
59)       b2 = y2*r2+a1change*k12+a2change*k22+oldb
60)       if (a1 > 0 && a1 < C)
61)           b = b1
62)       else if (a2 > 0 && a2 < C)
63)           b = b2
64)       else
65)           b = 0.5*(b1−b2)
66)       Update weight vector to reflect change in a1 & a2,
          if SVM is linear
67)       Update stored error, if necessary
68)       Store a1 in the alpha array
69)       Store a2 in the alpha array
70)       return 1
71) endprocedure
72)
73) procedure examineExample(i2)
74)       y2 = target[i2]
75)       alph2 = Lagrange multiplier for i2
76)       e2 = real error for i2
77)       r2 = e2*y2
78)       if ((r2 < −tol && alph2 < C) || (r2 > tol && alph2 > 0))
79)       {
80)           if (number of non-zero & non-C alpha > 1)
81)           {
82)               i1 = choose an element out of the non-zero and non-C alpha
83)               if takeStep(i1,i2)
84)                   return 1
85)           }
86)           loop over all non-zero and non-C alpha,
              starting at a random point
87)           {
88)               i1 = identity of current alpha
89)               if takeStep(i1,i2)
90)                   return 1
91)           }
92)           loop over all possible i1, starting at a random point
93)           {
94)               i1 = loop variable
95)               if (takeStep(i1,i2)
96)                   return 1
97)           }
98)       }
99)       return 0
100) endprocedure
101)
102) main routine:
103)      numChanged = 0;
104)      examineAll = 1;
105)      while (numChanged > 0 | examineAll)
106)      {
107)          numChanged = 0;
108)          if (examineAll)
109)              loop I over all training examples
110)                  numChanged += examineExample(I)
111)          else
112)              loop I over examples where alpha is not 0 & not C
113)                  numChanged += examineExample(I)
114)          if (examineAll == 1)
115)              examineAll = 0
116)          else if (numChanged == 0)
117)              examineAll = 1
118)      }
```

What is claimed is:

1. A method for operating a machine to train an object classifier based on a set of object training examples represented by feature vectors ($x_i$) and predetermined classifications ($y_i$) associated with the each of the object training examples, where the object classifier determines a classification output (O) of an object represented by feature vector ($x_{input}$) as:

$$O = \sum_{i=1}^{\text{number of training examples}} y_i \alpha_i k(\vec{x}_i, \vec{x}_{input})$$

where $\alpha_i$ is a Lagrange multiplier associated with the $i^{th}$ training example, and k is a kernel function, the method comprising steps of:

a) initializing, with the machine, each of the Lagrange multipliers;
   b) sweeping through at least some of the training examples of the set of training examples;
   c) for each training example of the sweep, correcting, with the machine, a Lagrange multiplier associated with the training example to generate a corrected Lagrange multiplier, if the Lagrange multiplier is not optimal;

d) storing, with the machine, the corrected Lagrange multiplier; and e) repeating steps (b), (c) and (d) if any Lagrange multiplier was changed during the sweep, thereby training the object classifier.

2. The method of claim 1 wherein the step of initializing each of the Lagrange multipliers sets each of the Lagrange multipliers to zero.

3. The method of claim 1 wherein the step of sweeping through at least some of the training examples of the set of training examples sweeps through all of the training examples of the set of training examples for each sweep.

4. The method of claim 1 wherein the step of sweeping through at least some of the training examples of the set of training examples sweeps through all of the training examples on an initial sweep, and if any Lagrange multipliers were changed during the sweep, sweeps through a part of the training examples on a subsequent sweep.

5. The method of claim 1 further comprising a step of:

accepting, with the machine, a cost parameter (C) for adjusting non-separable training examples, wherein, the step of sweeping through at least some of the training examples of the set of training examples sweeps through all of the training examples on an initial sweep, and if any Lagrange multipliers were changed during the initial sweep, sweeps through non-boundary training examples on a subsequent sweep, wherein a non-boundary training example has an associated Lagrange multiplier greater than zero but less than C.

6. The method of claim 1 wherein the step of correcting a Lagrange multiplier associated with the training example, if the Lagrange multiplier is not optimal, includes sub-steps of:

i) determining, with the machine, whether the Lagrange multiplier is optimal;

ii) if the Lagrange multiplier is determined not to be optimal, determining, with the machine, a new Lagrange multiplier based on the Lagrange multiplier, an error, and the kernel function of the training example; and iii) limiting, with the machine, the new Lagrange multiplier.

7. The method of claim 6 wherein the sub-step of determining whether the Lagrange multiplier is optimal is performed by determining, with the machine, whether Kuhn-Tucker conditions are satisfied.

8. The method of claim 6 wherein the error is a Kuhn-Tucker error.

9. The method of claim 8 wherein the Kuhn-Tucker error is defined as $(1-O_n y_n)$, where $O_n$ is a classification output of the $n^{th}$ training example and $y_n$ is the predetermined classification associated with the $n^{th}$ training example.

10. The method of claim 8 wherein the new Lagrange multiplier associated with the $n^{th}$ training example ($\alpha_n^{new}$) is defined as:

$$\alpha_n^{new} = \alpha_n^{old} + \frac{Kuhn - Tucker\ Error}{k(\vec{x}_n, \vec{x}_n)}$$

11. The method of claim 10 wherein the object classifier defines a hyperplane which separates objects in a class from objects not in the class, and wherein the object classifier determines a classification output (O) of an object represented by feature vector ($x_{input}$) as:

$$O = \sum_{i=1}^{\substack{number\ of \\ training \\ examples}} \vec{w} \cdot \vec{x}_{input} - b$$

where w is a weight vector.

12. The method of claim 11 wherein the sub-step of limiting the new Lagrange multiplier includes a step of setting, with the machine, the new Lagrange multiplier to zero if it is less than zero, and setting the new Lagrange multiplier to C if it is greater than C.

13. The method of claim 1 wherein the act of correcting a Lagrange multiplier associated with the training example to generate a corrected Lagrange multiplier, if the Lagrange multiplier is not optimal, is done without consideration of any training examples other than the training example associated with the Lagrange multiplier being corrected.

14. The method of claim 1 wherein the act of correcting a Lagrange multiplier associated with the training example to generate a corrected Lagrange multiplier, if the Lagrange multiplier is not optimal, corrects only the Lagrange multiplier associated with the training example only considering the Lagrange multiplier being corrected and information related to the associated training example.

15. A method for operating a machine to train an object classifier based on a set of object training examples represented by feature vectors ($x_i$) and predetermined classifications ($y_i$) associated with the each of the object training examples, where the object classifier determines a classification output (O) of an object represented by feature vector ($x_{input}$) as:

$$O = \sum_{i=1}^{\substack{number\ of \\ training \\ examples}} y_i \alpha_i k(\vec{x}_i, \vec{x}_{input})$$

where $\alpha_i$ is a Lagrange multiplier associated with the $i^{th}$ training example, and k is a kernel function, the method comprising steps of:

a) sweeping through at least some of the training examples of the set of training examples; and b) for each training example of the sweep, correcting, with the machine, only the Lagrange multiplier associated with the training example, using an analytic step, to generate a corrected Lagrange multiplier, if the Lagrange multiplier is not optimal; and c) storing, with the machine, the corrected Lagrange multiplier; thereby training the object classifier.

16. The method of claim 15 wherein the act of correcting a Lagrange multiplier associated with the training example to generate a corrected Lagrange multiplier, if the Lagrange multiplier is not optimal, is done without consideration of any training examples other than the training example associated with the Lagrange multiplier being corrected.

17. The method of claim 15 wherein the act of correcting a Lagrange multiplier associated with the training example to generate a corrected Lagrange multiplier, if the Lagrange multiplier is not optimal, corrects only the Lagrange multiplier associated with the training example only considering the Lagrange multiplier being corrected and information related to the associated training example.

18. An apparatus for training an object classifier based on a set of object training examples represented by feature vectors ($x_i$) and predetermined classifications ($y_i$) associated with the each of the object training examples, where the object classifier determines a classification output (O) of an object represented by feature vector ($x_{input}$) as:

$$O = \sum_{i=1}^{\text{number of training examples}} y_i \alpha_i k(\vec{x}_i, \vec{x}_{input})$$

where $\alpha_i$ is a Lagrange multiplier associated with the $i^{th}$ training example, and k is a kernel function, the apparatus comprising:
 a) a sweep controller for sweeping through at least some of the training examples of the set of training examples; and
 b) an optimizer for, for each training example of the sweep, correcting a Lagrange multiplier associated with the training example, using an analytic step, if the Lagrange multiplier is not optimal, thereby training the object classifier.

19. The apparatus of claim 18 wherein the optimizer for correcting a Lagrange multiplier associated with the training example to generate a corrected Lagrange multiplier, if the Lagrange multiplier is not optimal, does not consider any training examples other than the training example associated with the Lagrange multiplier being corrected.

20. The apparatus of claim 18 wherein the optimizer for correcting a Lagrange multiplier associated with the training example to generate a corrected Lagrange multiplier, if the Lagrange multiplier is not optimal, corrects only the Lagrange multiplier associated with the training example only considering the Lagrange multiplier being corrected and information related to the associated training example.

21. The apparatus of claim 18 wherein the sweep controller sweeps through all of the training examples of the set of training examples for each sweep.

22. The apparatus of claim 18 wherein the sweep controller sweeps through all of the training examples on an initial sweep, and if any Lagrange multipliers were changed during the initial sweep, sweeps through a part of the training examples on a subsequent sweep.

23. The apparatus of claim 18 further comprising a user interface for accepting a cost parameter (C) for non-separable training examples,
 wherein, the sweep controller sweeps through all of the training examples on an initial sweep, and if any Lagrange multipliers were changed during the initial sweep, sweeps through non-boundary training examples on a subsequent sweep, wherein a non-boundary training example has a Lagrange multiplier greater than zero but less than C.

24. The apparatus of claim 18 wherein the optimizer includes:
 i) means for determining whether the Lagrange multiplier is optimal; and
 ii) means, if the Lagrange multiplier is determined not to be optimal, for determining a new Lagrange multiplier based on the Lagrange multiplier, an error, and the kernal function of the training example.

25. The apparatus of claim 24 wherein the new Lagrange multiplier associated with the $n^{th}$ training example ($\alpha_n^{new}$) is defined as:

$$\alpha_n^{new} = \alpha_n^{old} + \frac{Kuhn - Tucker\ Error}{k(\vec{x}_n, \vec{x}_n)}$$

26. The apparatus of claim 24 wherein the optimizer further includes:
 iii) means for limiting the new Lagrange multiplier.

27. The apparatus of claim 26 wherein the means for limiting the new Lagrange multiplier sets the new Lagrange multiplier to zero if it is less than zero, and sets the new Lagrange multiplier to C if it is greater than C.

28. A method for operating a machine to train an object classifier based on a set of object training examples represented by feature vectors ($x_i$) and predetermined classifications ($y_i$) associated with the each of the object training examples, where the object classifier determines a classification output (O) of an object represented by feature vector ($x_{input}$) as:

$$O = \sum_{i=1}^{\text{number of training examples}} y_i \alpha_i k(\vec{x}_i, \vec{x}_{input}) - b$$

where $\alpha_i$ is a Lagrange multiplier associated with the $i^{th}$ training example and b is a threshold, the method comprising steps of:
 a) initializing, with the machine, each of the Lagrange multipliers;
 b) sweeping through at least some of the training examples of the set of training examples;
 c) for each training example of the sweep, determining, with the machine, whether the Lagrange multiplier associated with the training example is optimal;
 d) if, in step (c), it is determined that the Lagrange multiplier is not optimal, then performing the steps of:
  i) selecting, with the machine, another training example from the set of training examples;
  ii) jointly optimizing, if possible, with the machine, the Lagrange multiplier associated with the training example and the Lagrange multiplier associated with the other training example; and
  iii) if joint optimization was not possible in step (d) (ii), repeating steps (d) (i) and (d) (ii); and
 e) repeating steps (b), (c), and (d) if any Lagrange multipliers were determined not to be optimal in step (c) during the sweep, thereby training the object classifier.

29. The method of claim 28 wherein the step of initializing each of the Lagrange multipliers sets, with the machine, each of the Lagrange multipliers to zero.

30. The method of claim 28 wherein the step of sweeping through at least some of the training examples of the set of training examples sweeps through all of the training examples of the set of training examples for each sweep.

31. The method of claim 28 wherein the step of sweeping through at least some of the training examples of the set of training examples sweeps through all of the training examples on an initial sweep, and if any Lagrange multipliers were changed during the initial sweep, sweeps through a part of the training examples on a subsequent sweep.

32. The method of claim 28 further comprising a step of:
 accepting, with the machine, a cost parameter (C) for non-separable training examples, wherein, the step of sweeping through at least some of the training examples of the set of training examples sweeps through all of the training examples on an initial sweep, and if any Lagrange multipliers were changed during the initial sweep, sweeps through non-boundary training examples on a subsequent sweep, wherein a non-boundary training example has a Lagrange multiplier greater than zero but less than C.

33. The method of claim 28 further comprising a step of:
accepting, with the machine, a cost parameter (C) for non-separable training examples,
wherein the step of selecting another training example from the set of training examples comprises sub-steps of:
(A) determining, with the machine, an error of the Lagrange multiplier associated with the training example; and
(B) selecting, with the machine, the other training example by, in order of preference,
1) finding another training example having an associated Lagrange multiplier which is not equal to 0 or C, and which has an error most opposite the error determined in step (d)(i)(A),
2) finding another training example having an associated Lagrange multiplier which is not equal to 0 or C, and
3) finding another training example having an associated Lagrange multiplier.

34. The method of claim 33 wherein the error of an $i^{th}$ Lagrange multiplier is defined as $(y_i-O_i)$.

35. The method of claim 28 wherein the step of jointly optimizing the Lagrange multiplier ($\alpha_1$) associated with the training example and the Lagrange multiplier ($\alpha_2$) associated with the other training example includes sub-steps of:
i) determining, with the machine, a new Lagrange multiplier ($\alpha_2^{new}$) associated with the other training example as:

$$\alpha_2^{new} = \alpha_2 + \frac{y_1 y_2 KUHN-TUCKER\ ERROR_1 - KUHN-TUCKER\ ERROR_2}{k(\vec{x}_1, \vec{x}_1) + k(\vec{x}_2, \vec{x}_2) - 2k(\vec{x}_1, \vec{x}_2)}$$

where KUHN-TUCKER ERROR$_1$ is $(1-O_1 y_1)$, and KUHN-TUCKER ERROR$_2$ is $(1-O_2 y_2)$;
ii) limiting, with the machine, the new Lagrange multiplier associated with the other training example to obtain ($\alpha_2^{new,limited}$); and
ii) determining, with the machine, a new Lagrange multiplier ($\alpha_1^{new}$) associated with the training example as:

$$\alpha_1^{new} = \alpha_1 + y_1 y_2(\alpha_2 - \alpha_2^{new,limited}).$$

36. The method of claim 35 wherein the sub-step of limiting the new Lagrange multiplier associated with the other training example includes steps of:
A) if $y_1$ is the same sign as $y_2$, determining, with the machine, an upper limit H as $$H=min(C, \alpha_1+\alpha_2)$$

B) if $y_1$ is the not the same sign as $y_2$, determining, with the machine, an upper limit H as:

$$H=min(C, C-\alpha_1+\alpha_2)$$

C) if $y_1$ is the same sign as $y_2$, determining, with the machine, a lower limit L as $$L=max(0, \alpha_1+\alpha_2-C)$$

D) if $y_1$ is not the same sign as $y_2$, determining, with the machine, a lower limit L as $$L=max(0, \alpha_2-\alpha_1).$$

37. The method of claim 28 wherein the act of jointly optimizing, if possible, the Lagrange multiplier associated with the training example and the Lagrange multiplier associated with the other training example, if the Lagrange multiplier is not optimal, is done without consideration of any training examples other than the training example and the selected other training example.

38. An apparatus for training an object classifier based on a set of object training examples represented by feature vectors ($x_i$) and predetermined classifications ($y_i$) associated with the each of the object training examples, where the object classifier determines a classification output (O) of an object represented by feature vector ($x_{input}$) as:

$$O = \sum_{i=1}^{\substack{number\ of\\ training\\ examples}} y_i \alpha_i k(\vec{x}_i, \vec{x}_{input}) - b$$

where $\alpha_i$ is a Lagrange multiplier associated with the $i^{th}$ training example and b is a threshold, the apparatus comprising:
a) a sweep controller for sweeping through at least some of the training examples of the set of training examples;
b) a determination facility for, for each training example of the sweep, determining whether the Lagrange multiplier associated with the training example is optimal;
c) a pairing facility for selecting another training example from the set of training examples if the determination facility determined that the Lagrange multiplier is not optimal; and
d) an optimizer for jointly optimizing, if possible, the Lagrange multiplier associated with the training example and the Lagrange multiplier associated with the other training example.

39. The apparatus of claim 38 wherein the sweep controller sweeps through all of the training examples of the set of training examples for each sweep.

40. The apparatus of claim 38 wherein the sweep controller sweeps through all of the training examples on an initial sweep, and if any Lagrange multipliers were changed during the initial sweep, sweeps through a part of the training examples on a subsequent sweep.

41. The apparatus of claim 38 further comprising a user interface for accepting a cost parameter (C) for non-separable training examples,
wherein, the sweep controller sweeps through all of the training examples on an initial sweep, and if any Lagrange multipliers were changed during the initial sweep, sweeps through non-boundary training examples on a subsequent sweep, wherein a non-boundary training example has a Lagrange multiplier greater than zero but less than C.

42. The apparatus of claim 38 further comprising a user interface for accepting a cost parameter (C) for non-separable training examples,
wherein the pairing facility:
(A) determines an error of the Lagrange multiplier associated with the training example; and (B) selects the other training example by, in order of preference,
1) finding another training example having an associated Lagrange multiplier which is not equal to 0 or C, and which has an error most opposite the error determined,
2) finding another training example having an associated Lagrange multiplier which is not equal to 0 or C, and
3) finding another training example having an associated Lagrange multiplier.

43. The apparatus of claim 42 wherein the error of an $i^{th}$ Lagrange multiplier is defined as $(y_i-O_i)$.

44. The apparatus of claim 38 wherein the optimizer for jointly optimizing the Lagrange multiplier ($\alpha_1$) associated with the training example and the Lagrange multiplier ($\alpha_2$) associated with the other training example:
i) determines a new Lagrange multiplier ($\alpha_2^{new}$) associated with the other training example as:

$$\alpha_2^{new} = \alpha_2 + \frac{y_1 y_2 KUHN-TUCKER\ ERROR_1 - KUHN-TUCKER\ ERROR_2}{k(\vec{x}_1,\vec{x}_1)+k(\vec{x}_2,\vec{x}_2)-2k(\vec{x}_1,\vec{x}_2)}$$

wherein KUHN-TUCKER ERROR$_1$ is $(1-O_1 y_1)$, and KUHN-TUCKER ERROR$_2$ is $(1-O_2 y_2)$;
ii) limits the new Lagrange multiplier associated with the other training example to obtain ($\alpha_2^{new,limited}$); and
ii) determines a new Lagrange multiplier ($\alpha_1^{new}$) associated with the training example as:

$\alpha_1^{new}=\alpha_1+y_1 y_2(\alpha_2-\alpha_2^{new,limited})$.

45. The apparatus of claim 44 wherein the optimizer limits the new Lagrange multiplier associated with the other training example to an upper limit H and a lower limit L which are determined as follows:
A) if $y_1$ is the same sign as $y_2$, determining an upper limit H as $H=min(C, \alpha_1+\alpha_2)$ B) if $y_1$ is the not the same sign as $y_2$, determining an upper limit H as:

$H=min(C, C-\alpha_1+\alpha_2)$

C) if $y_1$ is the same sign as $y_2$, determining a lower limit L as $L=max(0, \alpha_1+\alpha_2-C)$ D) if $y_1$ is not the same sign as $y_2$, determining a lower limit L as $L=max(0, \alpha_2-\alpha_1)$.

46. The apparatus of claim 38 wherein the optimizer for jointly optimizing, if possible, the Lagrange multiplier associated with the training example and the Lagrange multiplier associated with the other training example, if the Lagrange multiplier is not optimal, does not consider any training examples other than the training example and the selected other training example.

47. A method for operating a machine to train an object classifier based on a set of object training examples represented by feature vectors ($x_i$) and predetermined classifications ($y_i$) associated with the each of the object training examples, where the object classifier determines a classification output (O) of an object represented by feature vector ($x_{input}$) as:

$$O = \sum_{i=1} y_i \alpha_i k(\vec{x}_i, \vec{x}_{input})$$

where i is an index to all non-zero Lagrange multipliers, $\alpha_i$ is a Lagrange multiplier associated with the $i^{th}$ training example, and k is a kernel function, the method comprising steps of:
a) initializing, with the machine, each of the Lagrange multipliers;
b) sweeping through at least some of the training examples of the set of training examples;
c) for each training example of the sweep, correcting, with the machine, a Lagrange multiplier associated with the training example to generate a corrected Lagrange multiplier, if the Lagrange multiplier is not optimal;
d) storing, with the machine, the corrected Lagrange multiplier; and
e) repeating steps (b), (c) and (d) if any Lagrange multiplier was changed during the sweep, thereby training the object classifier.

48. The method of claim 47 wherein the object classifier defines a hyperplane which separates objects in a class from objects not in the class, and
wherein the object classifier determines a classification output (O) of an object represented by feature vector ($x_{input}$) as:

$$O = \sum_{i=1}^{number\ of\ training\ examples} \vec{w}\cdot\vec{x}_{input} - b$$

where w is a weight vector.

49. The method of claim 47 wherein the act of correcting a Lagrange multiplier associated with the training example to generate a corrected Lagrange multiplier, if the Lagrange multiplier is not optimal, is done without consideration of any training examples other than the training example associated with the Lagrange multiplier being corrected.

50. The method of claim 47 wherein the act of correcting a Lagrange multiplier associated with the training example to generate a corrected Lagrange multiplier, if the Lagrange multiplier is not optimal, corrects only the Lagrange multiplier associated with the training example only considering the Lagrange multiplier being corrected and information related to the associated training example.

* * * * *